United States Patent [19]
Miyasaka et al.

[11] Patent Number: 5,991,503
[45] Date of Patent: *Nov. 23, 1999

[54] MOVING PICTURE DATA STORING SYSTEM AND MOVING PICTURE DATA DECODING SYSTEM

[75] Inventors: Hideki Miyasaka; Hideaki Watanabe; Takehira Masanori; Kiyoshi Maeda, all of Kawasaki; Masao Mutou, Fukuoka; Hirohiko Inagaki, Yokohama, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/661,023

[22] Filed: Jun. 10, 1996

[30] Foreign Application Priority Data

Oct. 2, 1995 [JP] Japan ................................ 7-255382

[51] Int. Cl.$^6$ .............................. H04N 5/917; H04N 7/26
[52] U.S. Cl. ............................................ 386/111; 386/109
[58] Field of Search ................................. 386/109, 111, 386/112, 27, 33, 36, 67, 68, 6, 7, 8, 70, 124, 126, 125; 368/32; H04N 5/917, 7/26

[56] References Cited

U.S. PATENT DOCUMENTS 5,140,437   8/1992   Yonemitsu et al. ..................... 386/111

OTHER PUBLICATIONS

Abstract of Japan, Tsuboi, et al., 01–314080, Dec. 19, 1989.
Abstract of Japan, Matsubara, 05–344494, Dec. 24, 1993.
Abstract of Japan, Yamagishi, 06–268995, Sep. 22, 1994.
Abstract of Japan, Suzuki, et al., 06–315134, Nov. 08, 1994.
Abstract of Japan, Tantorii Bitsushiyuwanata, et al., 07–059051, Mar. 03, 1995.

*Primary Examiner*—Robert Chevalier
*Attorney, Agent, or Firm*—Staas & Halsey

[57] ABSTRACT

An encoding unit encodes and compresses picture data in a bit map format corresponding to the MPEG method. A packet assembling portion assembles the picture data encoded by the encoding unit as packets in the format corresponding to the MPEG method, and stores the packets to a storing medium. At this point, the packet assembling portion writes an I picture index to a packet that contains at least a part of I picture data. When a special reproducing operation is performed, a data storing unit reads only packets that have the I picture index. A decoding unit decodes only I picture data of picture data contained in packets read from the storing medium and displays the decoded picture data.

20 Claims, 17 Drawing Sheets

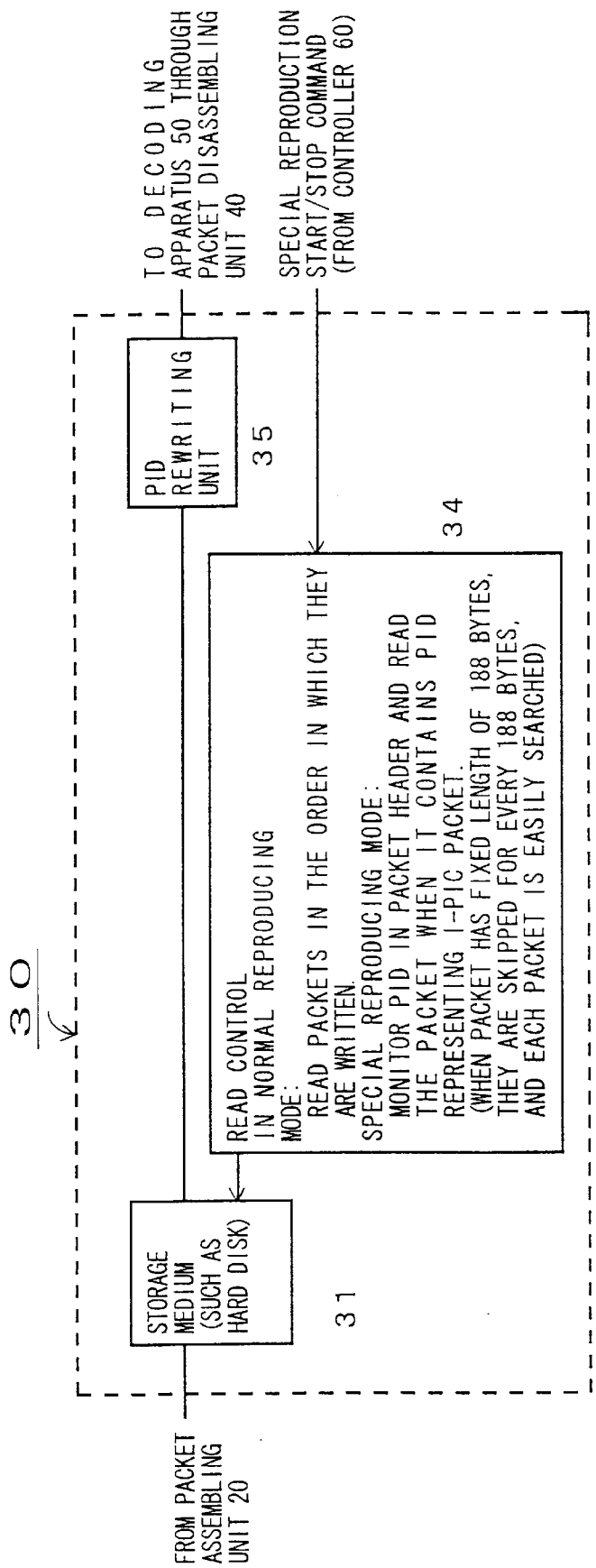
F I G. 10

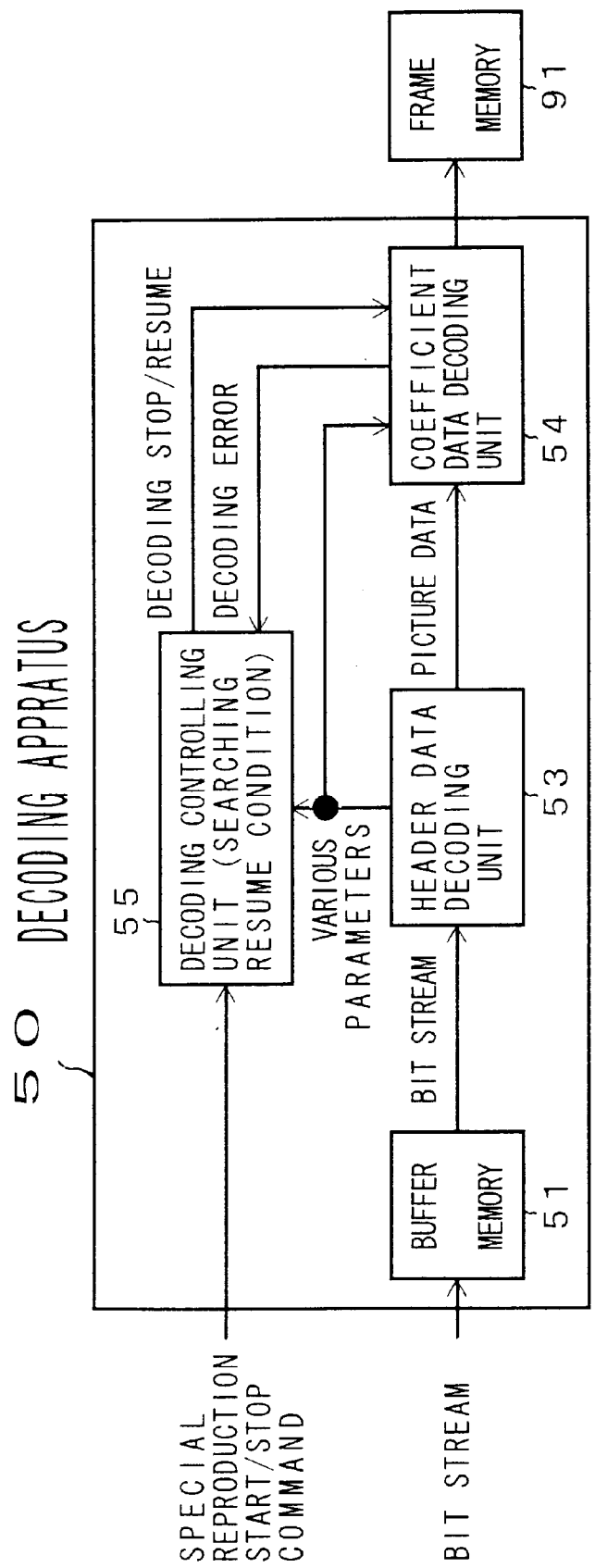
F I G. 12

5,991,503

MOVING PICTURE DATA STORING SYSTEM AND MOVING PICTURE DATA DECODING SYSTEM

BACKGROUND OF THE INVENTION

1. Field of the Invention

The present invention relates to a system for reproducing moving pictures in a special manner in an encoding system and a decoding system for picture data containing both intra-frame encoded picture data and inter-frame predictively encoded picture data.

2. Description of the Related Art

A system for reproducing picture data stored on a recording medium such as a CD-ROM and displaying the reproduced picture data as moving picture data on a display unit has been commonly used. In addition, a service such as VOD (Video On Demand) for receiving picture data stored in a remote server through a network and reproducing the picture data as moving picture data is also becoming common.

Normally, moving picture data is compressed (encoded) before it is stored or transmitted. As a method for compressing the moving picture data, the MPEG (Moving Picture coding Experts Group) method that has been proposed as an international standard is well known.

In the MPEG method, picture data is composed of three types of data that are I picture data, P picture data, and B picture data. The I picture (Intra-frame picture) data is data that is compressed corresponding to the intra-frame encoding method. One frame of picture data is reproduced with one I picture data. The P picture (Predictive picture) data is data that is compressed corresponding to the inter-frame predictive encoding method based on a moving compensative predictive method with a past frame of picture data. The B picture (Bidirectionally predictive picture) data is data that is compressed corresponding to the inter-frame predictive encoding method based on a moving compensative predictive method with a past frame or a future frame of picture data.

FIG. 1 is a block diagram showing a conventional picture encoding/decoding method. An encoding unit 201 receives bit-map format picture data and encodes (compresses) the picture data. In other words, an encoding unit 202 performs an encoding process for each frame and generates I picture data, P picture data, and B picture data. A buffer memory 203 temporarily stores the encoded picture data, reads the data at a predetermined timing, and sends the data to a packet assembling unit 204. The packet assembling unit 204 assembles the picture data that has been encoded by the encoding apparatus 201 as packets in the format corresponding to the MPEG method, and writes the packets on a storage medium 205.

When picture data is reproduced, a packet disassembling unit 206 sends a bit stream of picture data contained in the packets read from the storage medium 205 to a decoding apparatus 207. The decoding unit 207 temporarily stores the data received from the packet disassembling unit 206 in a buffer memory 208. A decoding unit 209 reads picture data from the buffer memory 208 at a predetermined timing, decodes (expands) the picture data, and writes the decoded data to a frame memory (not shown). The picture data written in the frame memory is reproduced on a display unit.

When the picture data is reproduced, a special reproducing operation such as a high speed reproducing operation or a high speed reverse reproducing operation may be required. This request is issued by, for example, a user. A controller 210 starts or stops the special reproducing process corresponding to such a request. Such a special reproducing operation is performed by decoding only I picture data compressed corresponding to the intra-frame encoding method. There are two decoding methods for decoding only the I picture data.

In the first method, the I picture data is extracted and decoded by the decoding unit 207. In the second method, the I picture data is extracted from the storage medium 205. The extracted I picture data is decoded by the decoding unit 207.

In the first method, when the special reproducing operation is performed, data that is the same as that for the normal reproducing operation is sent from the storage medium 205 to the decoding unit 207. When a three-times-normal speed reproducing operation is performed, data that is the same as that for the normal reproducing operation is sent at a speed three times higher than that for the normal reproducing operation. In other words, even if the special reproducing operation is performed, the I picture data, the P picture data, and the B picture data are sent from the storage medium 205 to the decoding unit 207. However, when the above-described special reproducing operation is performed, since only the I picture data is reproduced, the P picture data and the B picture data are removed, and are not used. Thus, in the first method, since data that is not reproduced is sent, the data transmission rate should be increased. Consequently, the cost of the final apparatus will rise. In addition, since a function for extracting the I picture data from data transmitted at a higher speed than the normal reproducing operation and for decoding the extracted I picture data is required, the cost of the final apparatus will further rise.

As an example of the second method, I picture data is stored on the storage medium 205 along with the normal picture data (packets of which picture data, composed of I picture data, P picture data, and B picture data, are divided into). When the special reproducing operation is performed, the I picture data is read and decoded. In this method, when the special reproducing operation is performed, since only the I picture data is sent to the decoding apparatus 207, the problem of the first method is solved. However, in the second method, an area for storing the I picture data is required along with an area for the normal picture data. Thus, the storage area of the storage medium 205 should be increased.

SUMMARY OF THE INVENTION

An object of the present invention is to provide a method for performing a special reproducing operation of picture data in an effective and simple manner without the need to increase the storage capacity of a storage medium.

The present invention is a moving picture data storing system for dividing picture data composed of intra-frame encoded data encoded corresponding to an intra-frame encoding method, and inter-frame predictively encoded data encoded corresponding to an inter-frame predictively encoding method, into packets in a predetermined format and writing, when storing the packets on a data storage medium, to a predetermined position of a packet containing at least a part of the intra-frame encoded data, the information that the packet contains the packet contains intra-frame encoded data. Thus, when moving picture data is reproduced with only the intra-frame encoded data, by searching the information, only packets that contain at least a part of the intra-frame encoded data will be read from the storage medium.

When the moving picture data is reproduced with only the intra-frame encoded data, the decoding unit performs a decoding process for only packets that contain at least a part of the intra-frame encoded data. At this point, since the decoding unit does not perform the decoding process for packets that do not contain the intra-frame encoded data, the load on the decoding unit is reduced.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 10 is a functional block diagram showing a structure of a data storing unit;

FIG. 12 is a block diagram showing a structure of a decoding unit;

DETAILED DESCRIPTION OF THE PREFERRED EMBODIMENTS

Next, with reference to FIG. 2, the present invention will be described.

In the present invention, picture data composed of intra-frame encoded data encoded corresponding to the intra-frame encoding method and inter-frame predictively encoded data encoded corresponding to the inter-frame predictive encoding method is processed.

Figure 1:
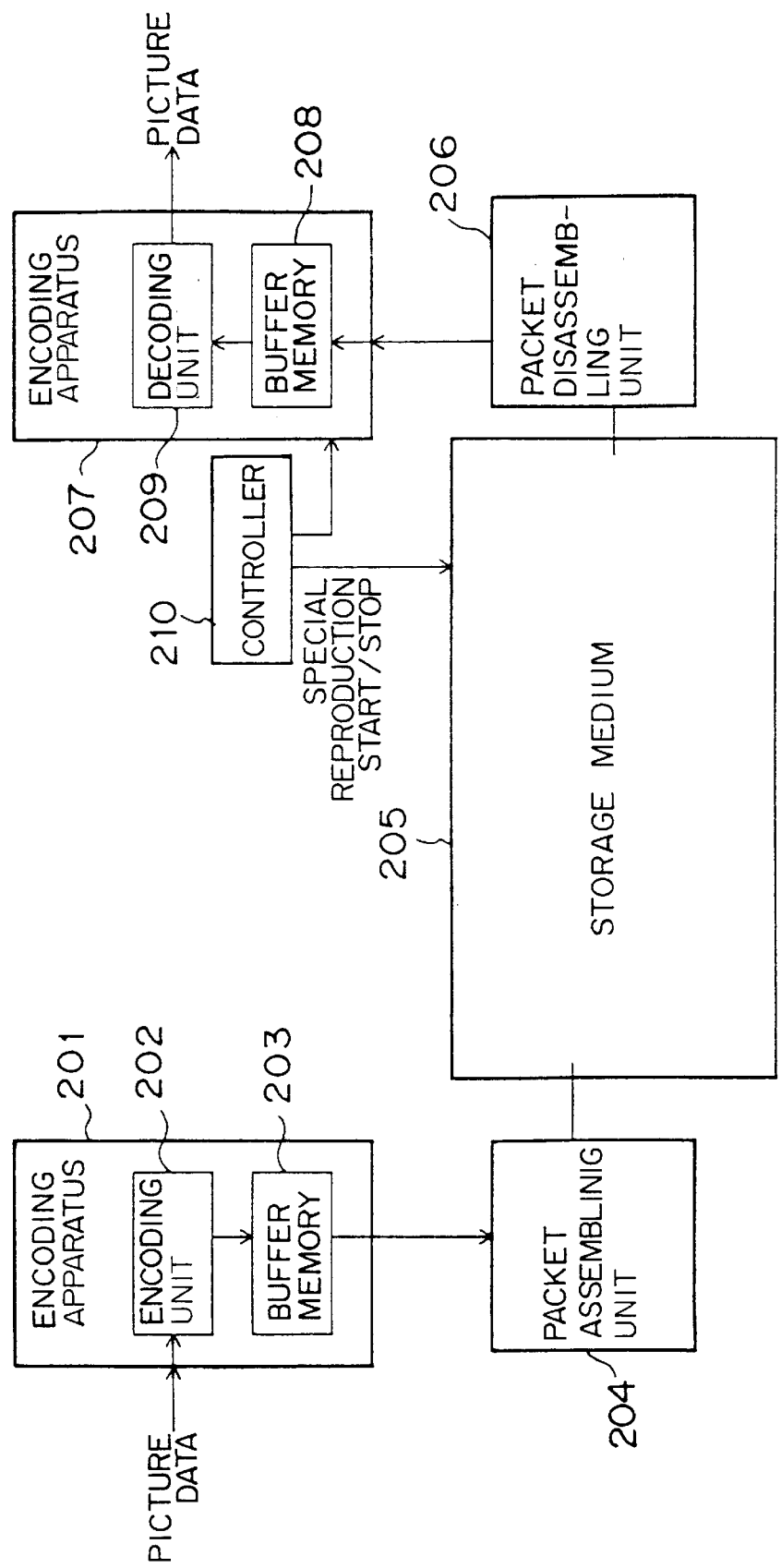
FIG. 1 is a block diagram showing a conventional picture data encoding/decoding system.
Figure 2:
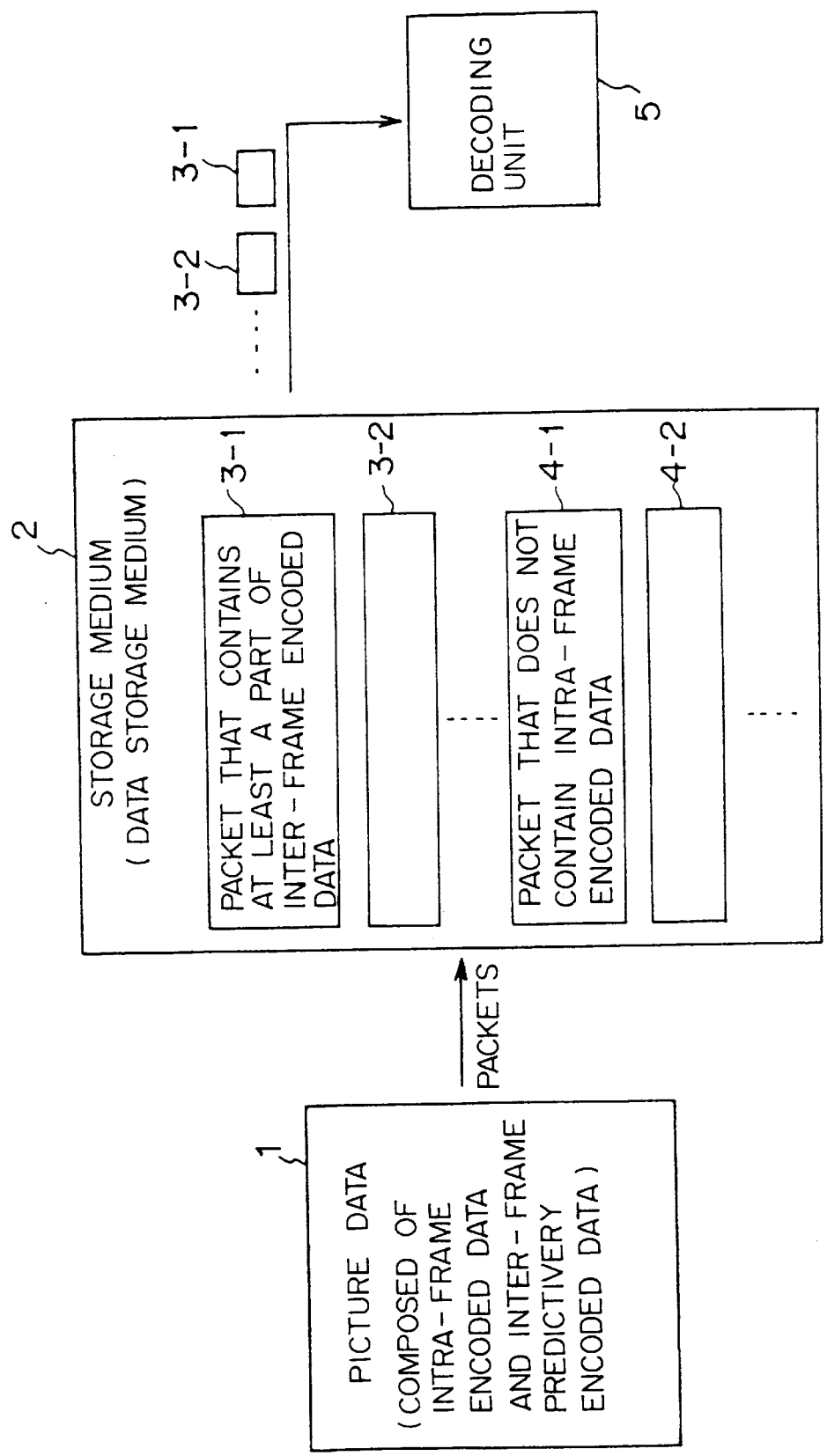
FIG. 2 is a schematic diagram for explaining the principle of the present invention.

Referring to FIG. 2, when picture data 1 is stored in a storage medium 2, the picture data 1 is divided into packets in a predetermined format. At this point, packets 3-1, 3-2, ... and so forth that contain at least a part of intra-frame encoded data, and packets 4-1, 4-2, ... and so forth that do not contain the intra-frame encoded data, are generated. When these packets are stored on the storage medium 2, information representing that these packets contain the intra-frame encoded data is written to the packets 3-1, 3-2, ... and so forth, which contain at least a part of the intra-frame encoded data.

When moving picture data is reproduced with only the intra-frame encoded data, the packets 3-1, 3-2, ... and so forth, which contain at least a part of the intra-frame encoded data, are read from the storage medium 2. The reading process can be easily performed by extracting packets in which the information has been written.

A decoding unit 5 decodes data contained in the packets read from the storage medium 2. Thus, when moving picture data is reproduced with only the intra-frame encoded data, the decoding process is performed for only the data contained in the packets 3-1, 3-2, ... and so forth, which contain at least a part of the intra-frame encoded data. The decoded data of the intra-frame encoded data is output as reproduced data of the moving picture data. As a method for decoding only the intra-frame encoded data, when the intra-frame encoded data is detected, the decoding process is started. When the inter-frame predictively encoded data is detected, the encoding process is stopped. When the picture data is reproduced, the decoding process is not performed for the packets 4-1, 4-2, ... and so forth, which do not contain the intra-frame encoded data, therefore the load on the decoding unit 5 is reduced.

Next, preferred embodiments of the present invention will be described with reference to the accompanying drawings. In the following description, the special reproducing operation for the moving picture data includes, for example, a high speed reproducing operation and a high speed reverse reproducing operation. Moving picture data is reproduced with only picture data compressed corresponding to the intra-frame encoding method (namely, I picture data corresponding to the MPEG method).

Figure 3:
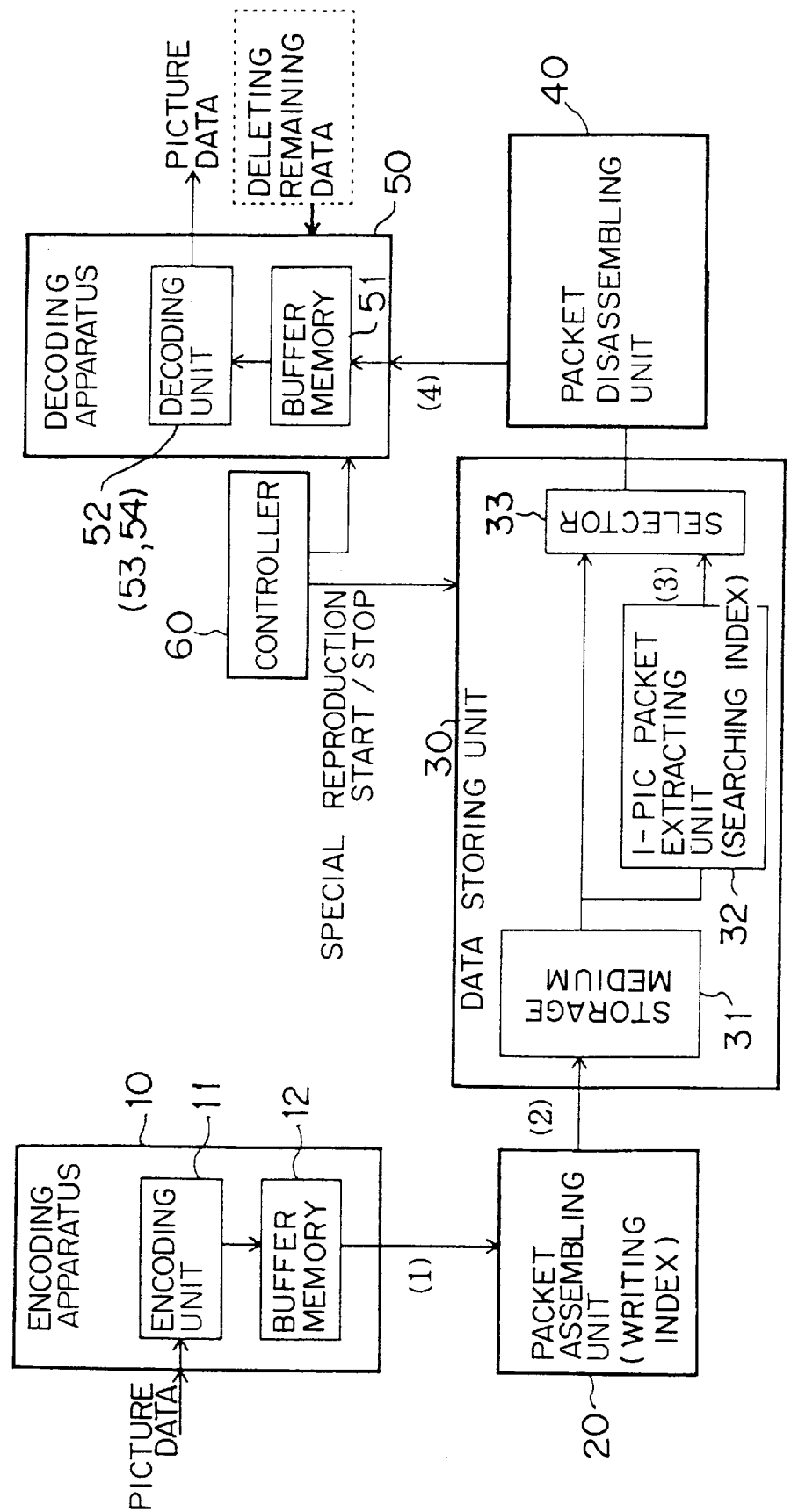
FIG. 3 is a block diagram showing a structure of a picture data encoding/decoding system according to an embodiment of the present invention.

FIG. 3 is a block diagram showing a picture data encoding/decoding system according to an embodiment of the present invention. Next, a structure of an encoding compressing system for moving picture data corresponding to the MPEG method will be described.

An encoding apparatus 10 receives bit-map format picture data and encodes (compresses) the picture data corresponding to the MPEG method. In other words, an encoding unit 11 performs an encoding process for each frame of the picture data and generates I picture data, P picture data, and B picture data from the picture data. The encoding unit 11 generates one I picture data for every predetermined number of frames (for example, five frames). The buffer memory 12 temporarily stores the encoded picture data, reads it at a predetermined timing, and sends it to a packet assembling unit 20.

The packet assembling unit 20 assembles the picture data that has been encoded by the encoding apparatus 10 as packets in the format corresponding to the MPEG method, and writes the packets to a storage medium 31. The length of each packet is fixed (for example, 188 bytes). When the packet assembling unit 20 divides a bit stream of picture data composed of I picture data, P picture data, and B picture data into a large number of packets, the packet assembling unit 20 writes information that represents that a relevant packet contains at least a part of I picture data to a packet that contains at least a part of I picture data. This information is referred to as the I picture index. The I picture index will be described later. On the other hand, the packet assembling unit 20 does not write the I picture index to a packet that does not contain the I picture data. The method for determining whether or not each packet incudes the I picture data will be described later.

A data storing unit 30 stores packets assembled by the packet assembling unit 20 and reads the packets corresponding to a request received from the user. The data storing unit 30 is, for example, a server for a VOD service. The packets assembled by the packet assembling unit 20 are stored on the storage medium 31. The storage medium 31 is, for example, a hard disk or an optical disc device. An I picture packet extracting unit 32 extracts a packet that contains at least a part of the I picture data (this packet is referred to as the I picture packet). In other words, the I picture packet extracting unit 32 extracts only packets that contain the I picture index from packets stored on the storage medium 31, and sends the extracted packets to a selector 33.

Packets read from the storage medium 31 are also directly sent to an input terminal of the selector 33. In other words, the packets are read from the storage medium 31, in the order in which they are written to the storage medium 31. The packets are input to one input terminal of the selector 33. Only I picture packets extracted by the I picture packet extracting unit 32 are input to the other input terminal of the selector 33. When the user requests the "normal reproducing operation", the selector 33 outputs all the packets read from the storage medium 31. When the user requests the "special reproducing operation", the selector 33 outputs only the I picture packets extracted by the I picture packet extracting unit 32. The user's request is sent to the data storing unit 30 through a controller 60.

A packet disassembling unit 40 converts picture data contained in the packets received from the data storing unit 30 into a bit stream and sends it to a decoding apparatus 50. When the data storing unit 30 is a server for a VOD service, the data storing unit 30 and the packet disassembling unit 40 are connected through a public telephone line or a dedicated transmission line.

A decoding apparatus 50 temporarily stores picture data received from the packet disassembling unit 40 to a buffer memory 51. A decoding unit 52 reads picture data from the buffer memory 51 at a predetermined timing. The decoding unit 52 decodes (expands) the picture data corresponding to the MPEG method. When the user requests a "normal reproducing operation", the decoding unit 52 decodes all picture data stored in the buffer memory 52. On the other hand, when the user requests a "special reproducing operation", the decoding unit 52 decodes only I picture data contained in the picture data read from the buffer memory 51. The decoding apparatus 50 writes the decoded picture data to a frame memory (not shown). The picture data written in the frame memory is reproduced (displayed) on the display unit. The user's request is sent to the decoding apparatus 50 through the controller 60.

Figure 4:
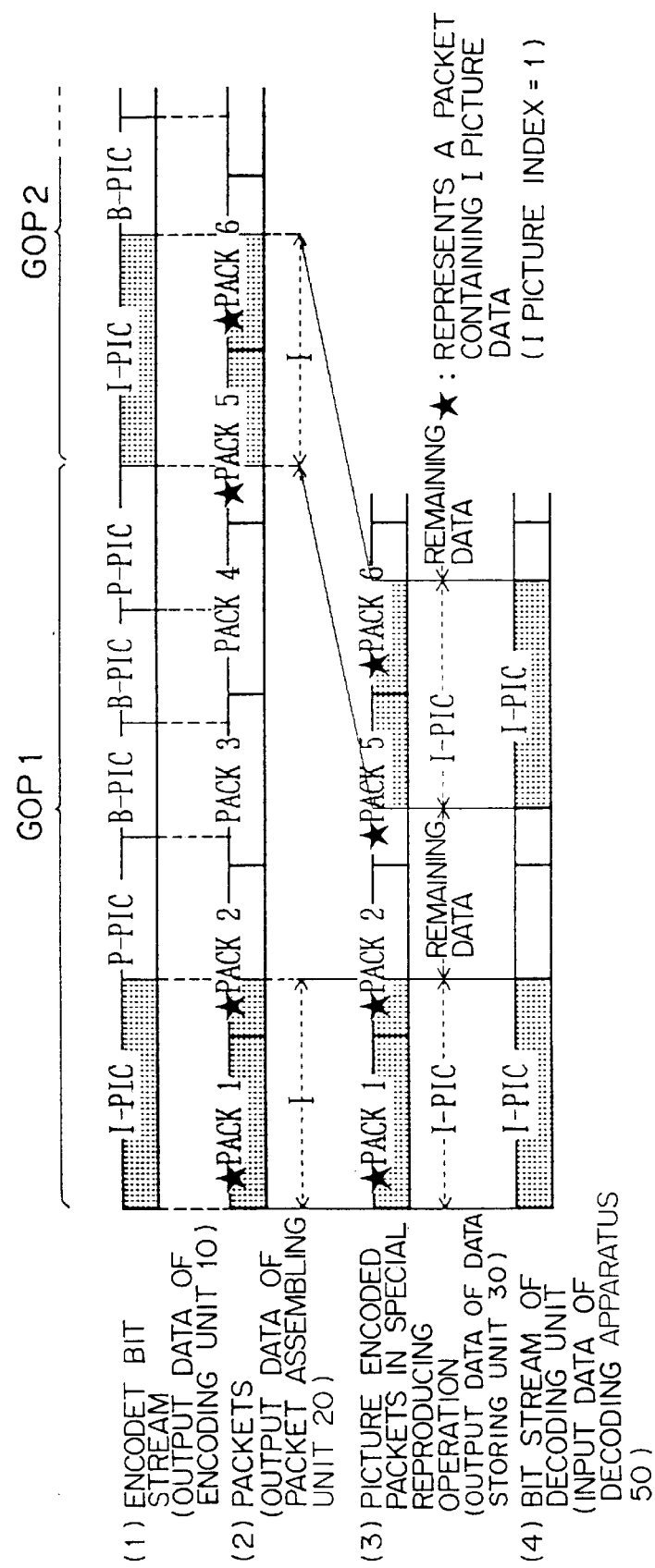
FIG. 4 is a schematic diagram showing the state of output data of the individual portions of the block diagram shown in FIG. 3.

FIG. 4 is a schematic diagram showing states of output data of individual portions of the block diagram shown in FIG. 3. As shown in FIG. 4(1), the encoding unit 10 outputs a bit stream of picture data encoded as I picture data, P picture data, and B picture data. In this embodiment, one I picture data is generated for every five frames (five pictures). In FIG. 4, a GOP (Group of Pictures) is a group composed of picture data corresponding to a plurality of frames containing at least one I picture data. In FIG. 4, one GOP is composed of five frames of picture data. A GOP header (not shown) is disposed at the top of each GOP. The GOP header is followed by I picture data, followed by P picture data and B picture data.

When the packet assembling unit 20 assembles picture data received from the encoding unit 10 as packets, the data length of the picture data (I picture data, P picture data, or B picture data) corresponding to each frame varies for each frame. Thus, depending on each frame, picture data thereof is stored in one packet or a plurality of packets. As shown in FIG. 4(2), I picture data in GOP 1 is contained in packets 1 and 2. P picture data and B picture data in GOP 1 are contained in packets 2 to 5. I picture data in GOP 2 is contained in packets 5 and 6. P picture data and B picture data in GOP 2 are contained in packet 6 and subsequent packets. The packets 2, 5, and 6 contain I picture data and other picture data (P picture data or B picture data).

Since the packets 1, 2, 5, and 6 contain at least a part of I picture data, the I picture index is written to each of these packets. In FIG. 4, the I picture index is denoted by an asterisk (*).

The storage medium 31 of the data storing unit 30 stores output data of the packet assembling unit 20. In other words, the storage medium 31 stores picture data as packets shown in FIG. 4(2).

When the user requests a "normal reproducing operation", the data storing unit 30 reads packets from the storage medium 31 in the order in which they are written thereto, and sends the packets to the packet disassembling unit 40. In other words, the data storing unit 30 sends picture data shown in FIG. 4(2) to the packet disassembling unit 40 in order without omitting any data. Thus, the packet disassembling unit 40 outputs a bit stream of the packets 1 to 6 in that order.

When the user requests a "special reproducing operation", the data storing unit 30 sends only I picture packets extracted by the I picture packet extracting unit 32 to the packet disassembling unit 40. The I picture packet extracting unit 32 extracts I picture packets (denoted by (*)) from the picture data shown in FIG. 4(2). Thus, the data storing unit 30 sends only the packets 1, 2, 5, and 6 to the packet disassembling unit 40 as shown in FIG. 4(3). Since the packet disassembling unit 40 outputs a bit stream of the received packets, when the special reproducing operation is performed, as shown in FIG. 4 (4), the packet disassembling unit 40 sends the bit stream of the packets 1, 2, 5, and 6 to the decoding apparatus 50.

The decoding apparatus 50 decodes the bit stream of picture data received from the packet disassembling unit 40. When the user requests a "normal reproducing operation", the decoding apparatus 50 decodes all of the bit stream. On the other hand, when the user requests a "special reproducing operation", the decoding apparatus 50 decodes only the I picture data and removes data other than the I picture data (namely, the remaining data). The process by which the decoding apparatus 50 decodes only the I picture data will be described later.

Figure 5:
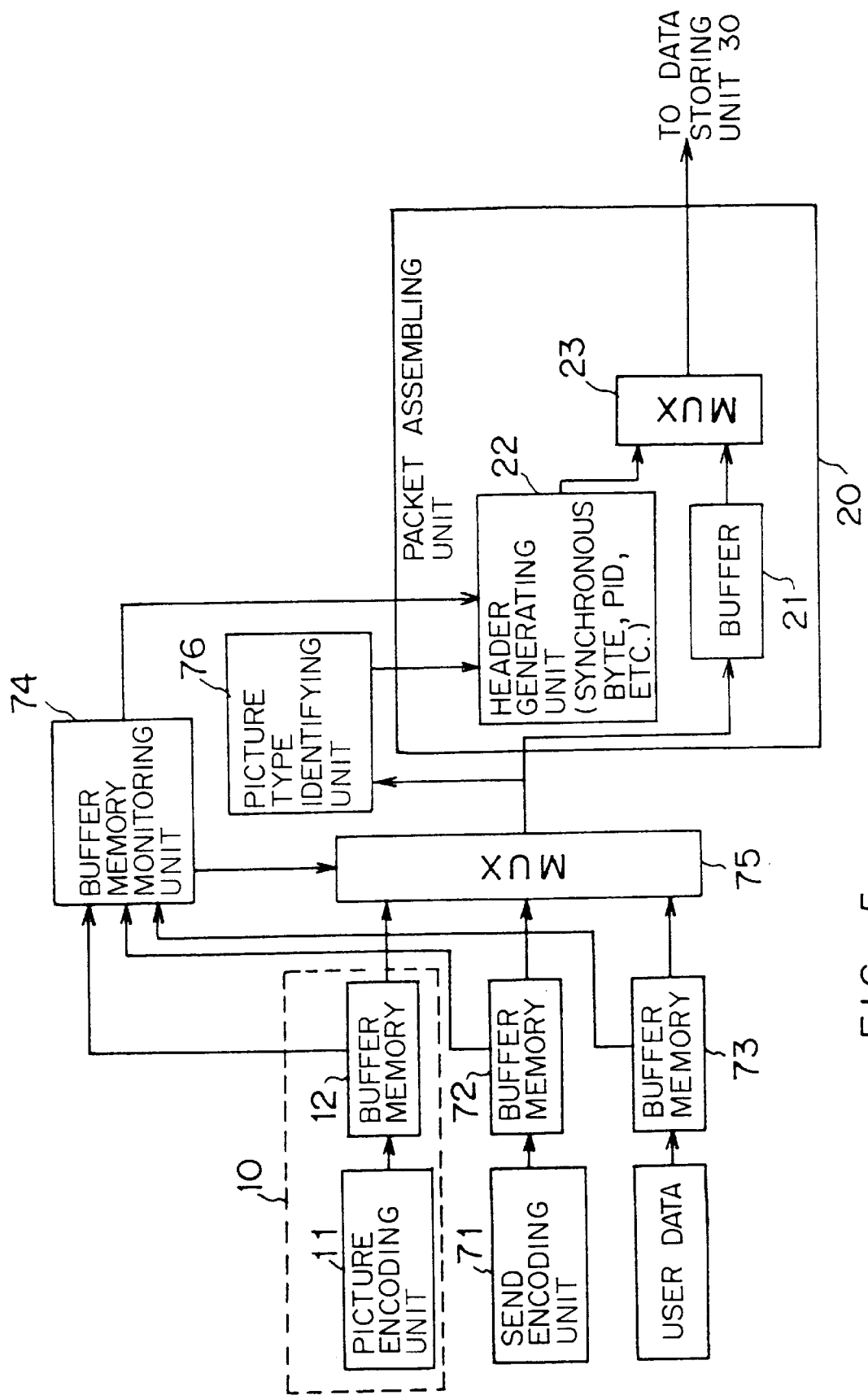
FIG. 5 is a block diagram showing structures of an encoding unit, a packet assembling unit, and peripheral units thereof.

FIG. 5 is a block diagram showing the encoding apparatus 10, the packet assembling unit 20, and peripheral units thereof. FIG. 3 shows only the structure for handling picture data. In reality, sound data and user data such as text data and control data are also processed. In other words, as shown in FIG. 5, a sound encoding unit 71 encodes sound data and stores the encoded data in a buffer memory 72. In addition, the user data is stored in a buffer memory 73.

A buffer memory monitoring unit 74 monitors the data amount used in the buffer memories 12, 72, and 73, and reads data from a buffer in which the data amount used in the buffer reaches a predetermined amount. At this point, the read data has a fixed length. The read data is contained in a payload of a packet (that will be described later). Data read from the individual buffer memories is sent to a multiplexing unit (MUX) 75. The MUX 75 multiplexes data received from the individual buffer memories and sends the multiplexed data to the packet assembling unit 20. At this point, the buffer memory monitoring unit 74 sends information representing a buffer memory from which data is read and its timing (read timing signal) to a header generating unit 22 in the packet assembling unit 20.

Data that is output from the MUX 75 is written to a buffer memory 21 of the packet assembling unit 20. At this point, a picture type identifying unit 76 detects picture data and identifies whether the picture data is I picture data, P picture data, or B picture data, and sends the identified result to the header generating unit 22.

Figure 6:
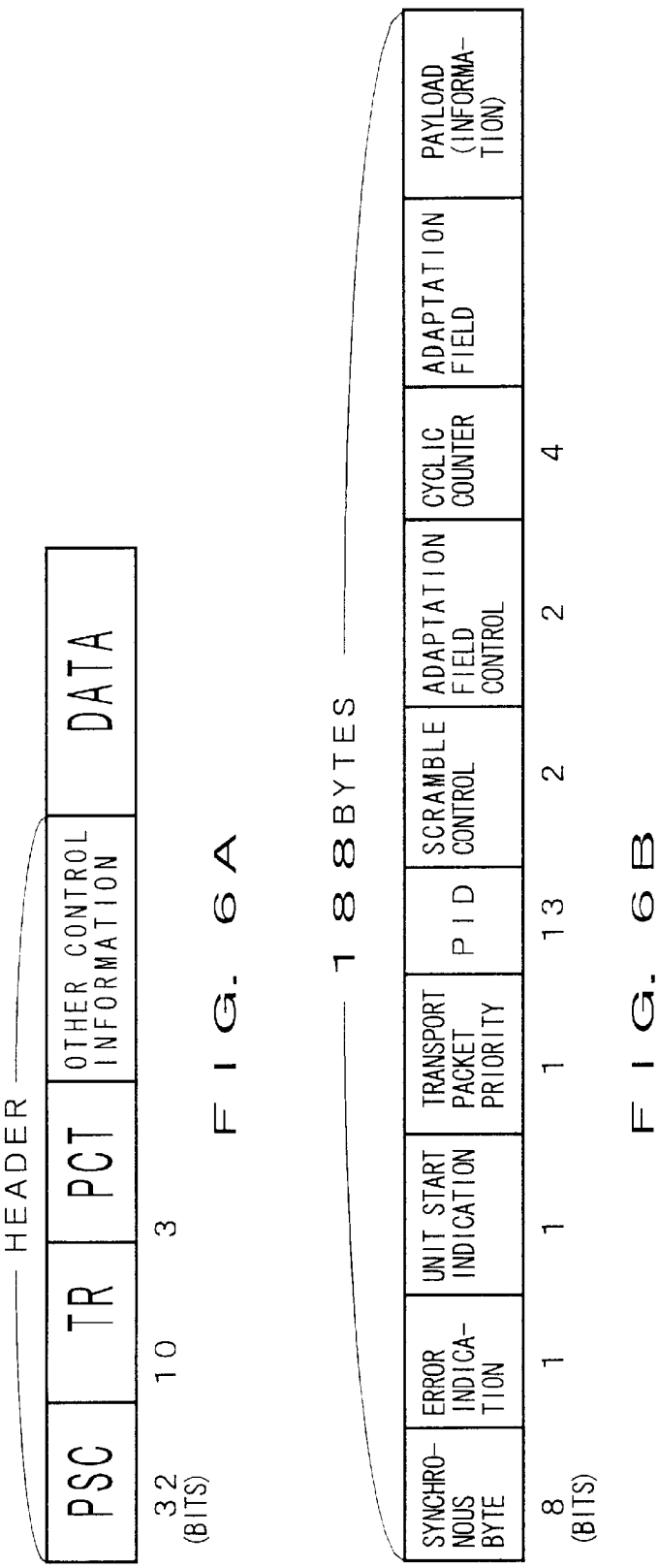
FIG. 6A is a schematic diagram showing a format of one frame of picture data.
FIG. 6B is a schematic diagram showing a format of a packet.

FIG. 6A is a schematic diagram showing a format of one frame of picture data (namely, I picture data, P picture data, or B picture data). In FIG. 6A, PSC (Picture Start Code) is a 32-bit synchronous signal that represents the top position of picture data. TR (Temporal Reference) is a number representing the display order of picture data. The PSC is followed by the TR, followed by PCT (Picture Coding Type). The PCT is 3-bit information that designates one of I picture data, P picture data, or B picture data. The PCT is designated corresponding to the encoding method for frames when picture data thereof is encoded by the encoding apparatus 10.

The picture type identifying unit 76 monitors the bit stream sent from the MUX 75 to the packet assembling unit 20. When the picture data is sent to the packet assembling unit 20, the picture type identifying unit 76 extracts the PCT from the picture data and identifies the picture type thereof. In other words, the picture type identifying unit 76 identifies whether the picture data is I picture data, P picture data, or B picture data. The picture type identifying unit 76 sends the identified result to the header generating unit 22 in the packet assembling unit 20.

The header generating unit 22 receives both the identified result from the picture type identifying unit 76 and the read timing signal from the buffer memory monitoring unit 74. Thus, the header generating unit 22 identifies the type of data received from the MUX 75 (namely, picture data, sound data, or user data). When the received data is picture data, the header generating unit 22 identifies the picture type.

FIG. 6B is a schematic diagram showing a format of a packet. This format is common to picture data, sound data, and user data. The header generating unit 22 generates portions from the synchronous byte at the top position of a packet to an adaptation field. The payload is data stored in the buffer memory 21. Information (picture data, sound data, or user data) contained in each packet is designated with a PID (Packet Identification). For example, sound data is designated "0005", user data is designated "0007", and picture data is designated "0003". Although picture data is designated "0003", an I picture packet (that contains at least a part of I picture data) is designated "0013". Information that represents the I picture packet (in this case "0013") is an I picture index that has been described with reference to FIG. 4.

The header generating unit 22 determines the PID corresponding to the type of data and generates a header with the PID. The header generating unit 22 sends the header to the MUX 23. The MUX 23 adds the header generated by the header generating unit 22 to a payload, that is the data read from the buffer memory 21 and sends the resultant packet to the data storing unit 30.

Figure 7:
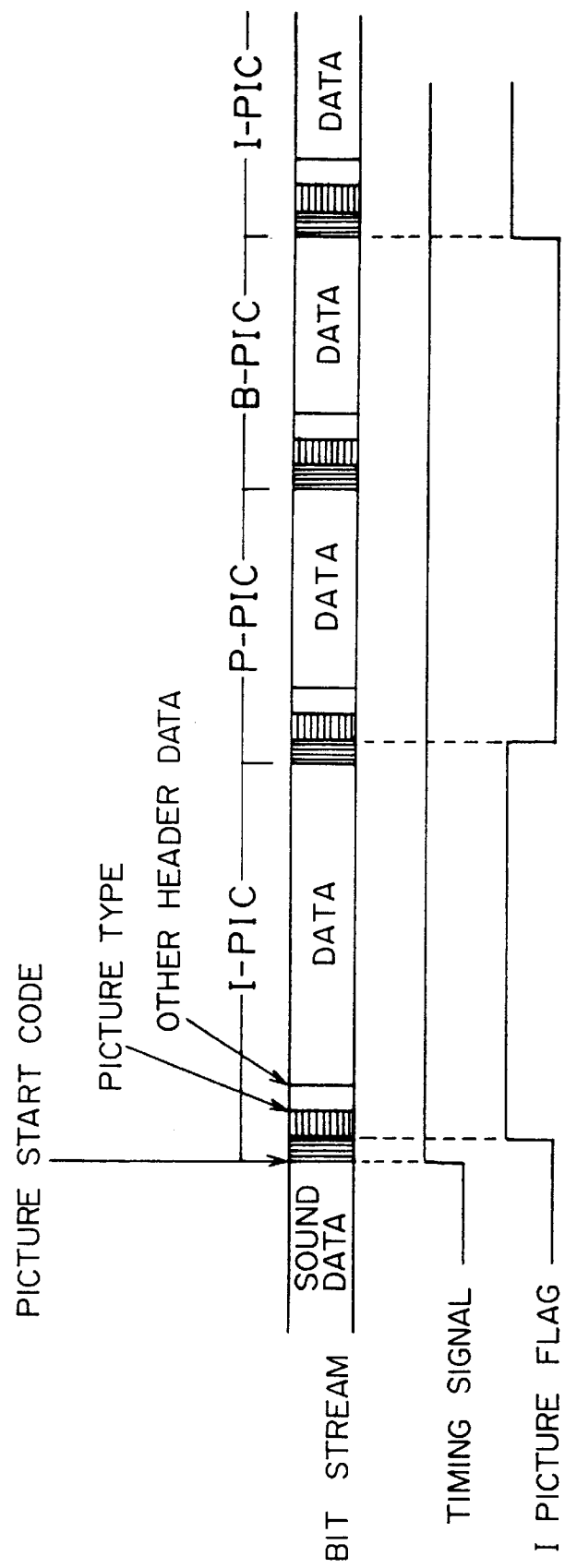
FIG. 7 is a schematic diagram for explaining a method for determining whether or not each packet contains I picture data.

Next, the method for determining whether or not a packet assembled with data sent to the packet assembling unit 20 contains the I picture data will be described. FIG. 7 is a schematic diagram for explaining the method for determining whether or not each packet contains the I picture data.

A timing signal is a signal whose signal level is "H" while the buffer memory monitoring unit 74 is reading data from the buffer memory 12. Thus, while the picture data is being sent to the packet assembling unit 20, the signal level of the timing signal is "H". An I picture flag is information that is set in the header generating unit 22. When I picture data is detected, "1" is set to the I picture flag. When P picture data or B picture data is detected, "0" is set to the I picture flag.

The header generating unit 22 determines whether or not each packet contains I picture data corresponding to the timing signal and the I picture flag. In other words, when the signal level of the timing signal is "H" and the value of the I picture flag is "1", the packet generated at this point is treated as an I picture packet. In this case, the header generating unit designates "0013" to the PID as the I picture index. On the other hand, when the signal level of the timing signal is "L" or when the value of the I picture flag is "0", the packet is not treated as an I picture packet and thereby the I picture index is not set.

Figure 8:
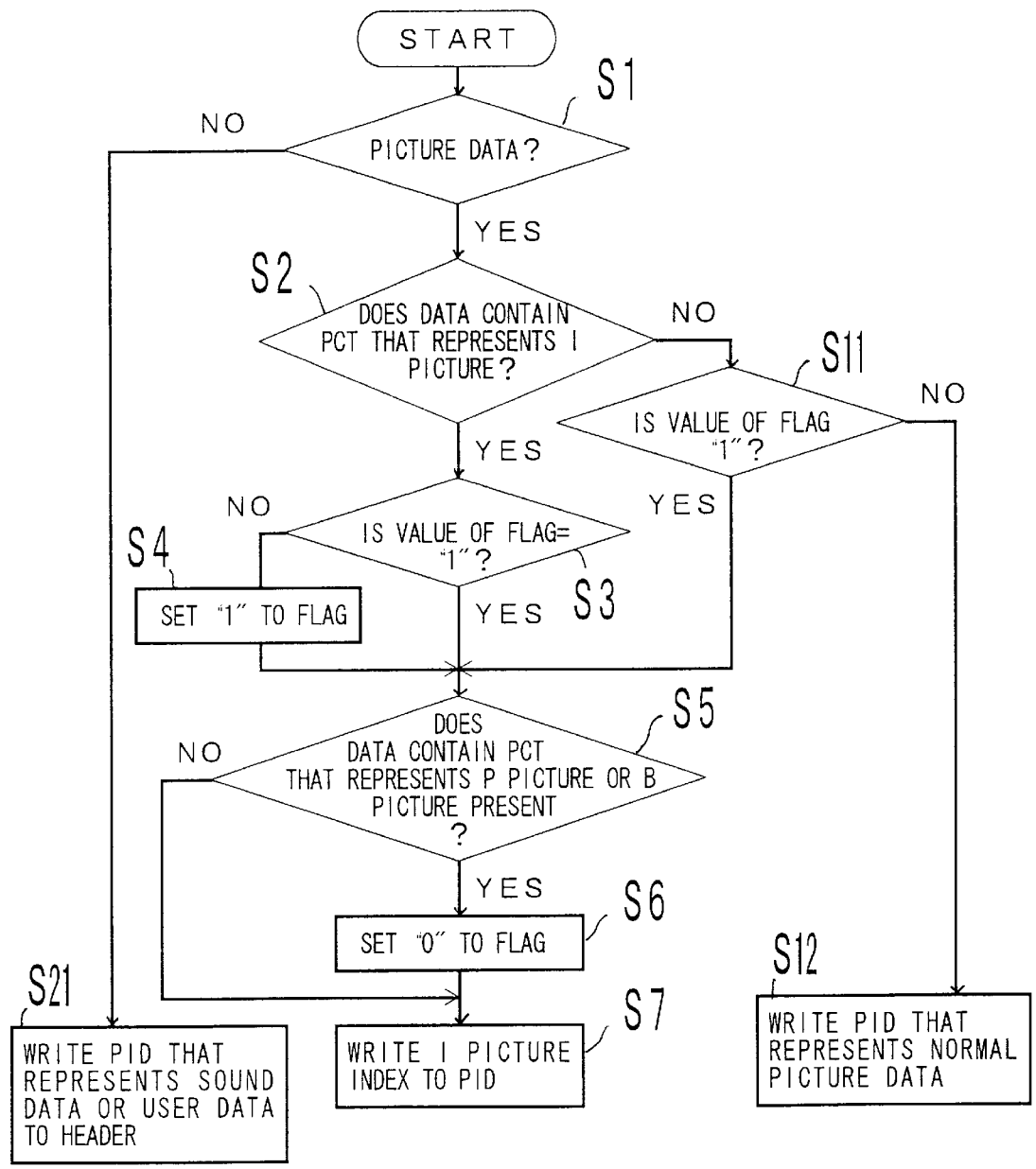
FIG. 8 is a operating flow chart for explaining an example of the method for determining whether or not each packet contains I picture data.

FIG. 8 is a operating flow chart for explaining an example of the method for determining whether or not each packet contains I picture data. In this example, data contained in the payload portion of a packet is read from one of the buffer memories 12, 72, and 73. The data is sent to the packet assembling unit 20. In this case, the header generating unit 22 performs the following operation.

At step S1, it is determined whether or not input data is picture data corresponding to a read timing signal received from the buffer memory monitoring unit 74. When the input data is not picture data, the flow advances to step S21. At step S21, a PID ("0005") that represents sound data or a PID ("0007") that represents user data is written to the header.

When the input data is picture data, the flow advances to step S2. At step S2, it is determined whether or not the data contains the PCT that represents I picture data. When the data contains the PCT that represents I picture data, the flow advances to step S3. At step S3, the value of the I picture flag is determined. When the value of the I picture data is not "1", the flow advances to step S4. At step S4, "1" is set to the I picture flag. When the value of the I picture flag is "1", the flow advances to step S5.

At step S5, it is determined whether or not the data contains a PCT that represents P picture data or B picture data. When a PCT that represents P picture data or B picture data is detected, the flow advances to step S6. At step S6, "0" is set to the I picture flag. Thereafter, the flow advances to step S7. When a PCT that represents P picture data or B picture data is not detected, the flow advances to step S7 skipping step S6.

At step S7, it is assumed that the input data contains at least a part of I picture data and the PID ("0013") that represents the I picture packet is written to the header.

When the determined result at step S2 is "NO" (namely, the input data does not contain a PCT that represents I picture data), the flow advances to step S11. At step S11, the value of the I picture flag is determined. When the value of the I picture flag is "1", the flow advances to the processes in steps S5 through S7. On the other hand, when the value of the I picture flag is not "1", the flow advances to step S12. At step S12, it is assumed that the input data is picture data that does not contain I picture data and the PID ("0003") that represents normal picture data is written to the header.

Figure 9:
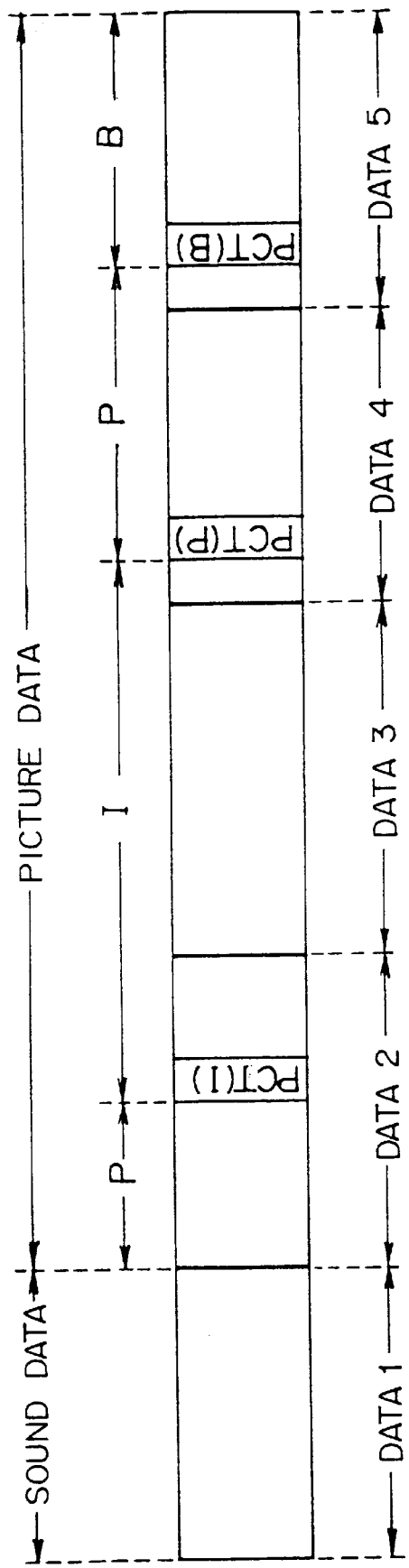
FIG. 9 is a supplementary schematic diagram for explaining the operating flow chart shown in FIG. 8.

FIG. 9 is a supplementary schematic diagram for explaining the flow chart shown in FIG. 8. In the example shown in FIG. 9, the packet memory monitoring unit 74 reads sound data as data 1 from the buffer memory 72. Thereafter, the packet memory monitoring unit 74 reads picture data as data 2 to data 5 from the buffer memory 12. The data 2 contains a part of P picture data and the top portion of I picture data. The data 3 contains only I picture data. The data 4 contains a part of I picture data and the top portion of P picture data. The data 5 contains a part of P picture data and the top portion of B picture data. A PCT that represents the type of picture data is contained at the top portion of each image data. The data 2, 4, and 5 contain PCTs that represent I picture data, P picture data, and B picture data, respectively. The data 1 to data 5 are data for payloads for individual packets.

When the data 1 is input to the packet assembling unit 20, since the data 1 is not picture data, the determined result at step S1 is "NO", the flow advances to step S21. At step S21, a PID that represents sound data is written.

When the data 2 is input to the packet assembling unit 20, since the data 2 contains a PCT that represents an I picture packet, the determined result at step S2 is "YES". The flow advances to step S4. At step S4, "1" is set to the I picture flag. The flow advances to step S7. At step S7, a PID that represents an I picture data is written. In other words, an I picture index is written.

When the data 3 is input to the packet assembling unit 20, the determined result at step S2 is "NO". However, since the value of the I picture flag is "1" due to the presence of the data 2, the determined result at step S11 is "YES". As with the data 2, the I picture index is written.

When the data 4 is input to the packet assembling unit 20, as with the data 3, the I picture index is written. However, since the data 4 contains the PCT that represents P picture data, the determined result at step S5 is "YES". Thus, "0" is set to the I picture flag.

When the data 5 is input to the packet assembling unit 20, since the determined result at step S2 is "NO", the flow advances to step S11. When the determined result at step S11 is "NO", the flow advances to step S12. At step S12, the PID that represents normal picture data (that does not contain I picture data) is written.

When the data 1 to data 5 are input to the packet assembling unit 20, the header generating unit 22 writes the I picture indexes to the data 2 to data 4. When, five packets that contain the data 1 to the data 5 are generated, three packets that contain the data 2 to data 4 become I picture packets. Each packet (including an I picture packet and packets other than the I picture packet) is stored on the storage medium 31.

FIG. 10 is a block diagram showing a function of the data storing unit 30. A read controlling unit 34 has the same function as the I picture packet extracting unit 32 and the selector 33 shown in FIG. 3.

When the read controlling unit 34 receives a "special reproduction stop command" or a "normal reproduction command" from the user through the controller 60, the read controlling unit 34 starts a normal packet reading operation. In other words, the read controlling unit 34 reads packets from the storage medium 31 in the order in which they have been written. In the example shown in FIG. 4, the read controlling unit 34 reads the packets 1 to 6 in that order thereof. The read controlling unit 34 sends the read packets to the packet disassembling unit 40.

When the read controlling unit 34 receives a "special reproduction start command" from the user, the read controlling unit 34 starts a packet reading operation for the special reproducing mode. In other words, the read controlling unit 34 determines a PID contained in the header of each packet and reads only packets that contain I picture indexes (namely, the I picture packets). Since each packet stored on the storage medium 31 has a fixed length (188 bytes), when addresses of the storage medium 31 are skipped for every 188 bytes, the PID of each packet can be easily searched.

A PID rewriting unit 35 rewrites the PID contained in the header of an I picture packet read from the storage medium 31. Since an I picture packet contains the I picture index as a PID, the PID rewriting unit 35 rewrites the I picture index to a PID that represent normal picture data (that represents that the packet does not contain I picture data). In reality, the PID rewriting unit 35 rewrites the PID contained in the I picture packet from "0013" to "0003". The PID rewriting process can be performed regardless of the normal reproducing mode or the special reproducing mode.

When a packet contains picture data, the PID contained in the packet read from the data storing unit 30 has the value ("0003") that represents that the packet has all normal picture data. When a packet contains sound data or user data, since the PID is not rewritten, the PID has the value "0005" or "0007".

Figure 11:
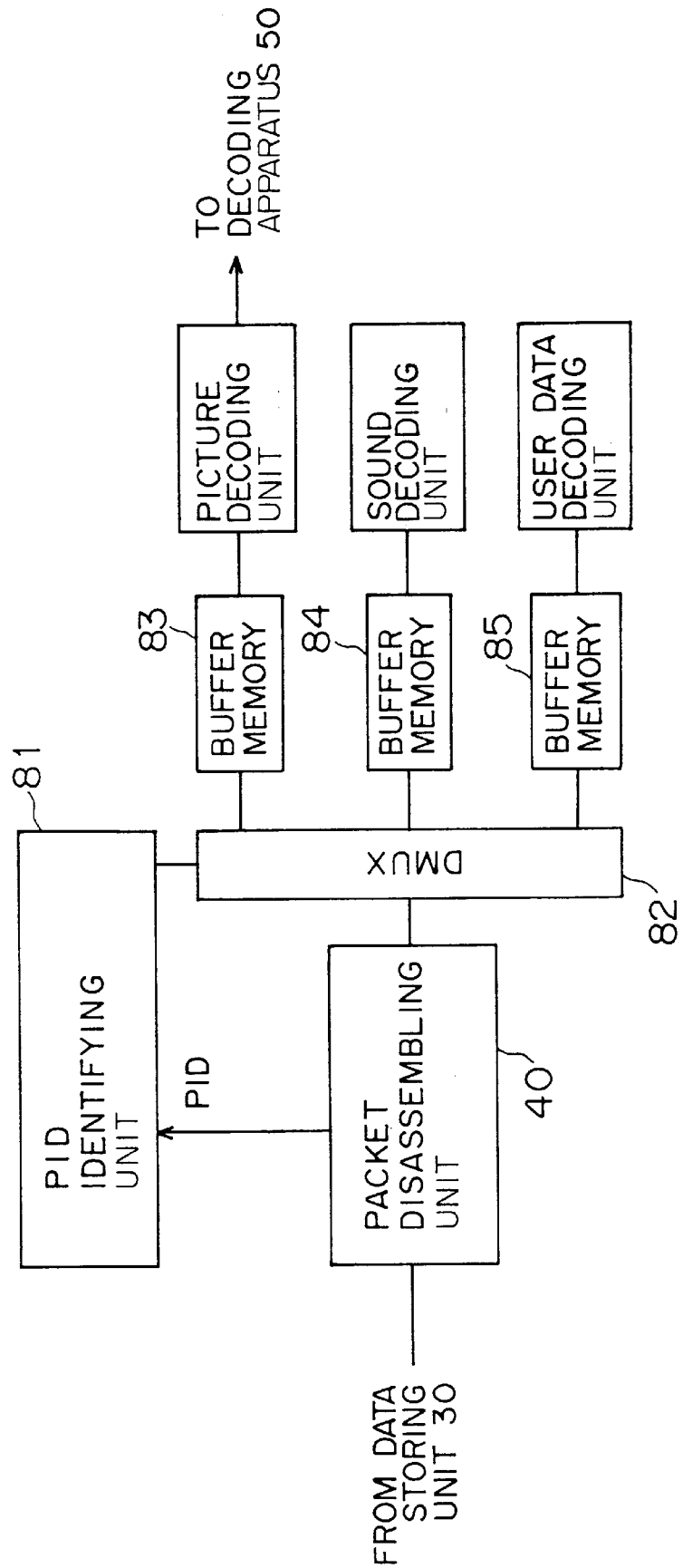
FIG. 11 is a block diagram showing structures of a packet disassembling unit and peripheral units thereof.

FIG. 11 is a block diagram showing the packet disassembling unit 40 and peripheral units thereof. When the packet disassembling unit 40 receives a packet from the data storing unit 30, the packet disassembling unit 40 separates the header from the payload of the packet. A PID identifying unit 81 detects the PID contained in the header and determines whether or not the data contained in the input packet is picture data, sound data, or user data. Corresponding to the determined result, the output data of a demultiplexing unit (DMUX) 82 is controlled. The data contained in the input packet is stored in a relevant one of buffer memories 83 to 85.

When a packet that contains picture data is input to the packet disassembling unit 40, the PID identifying unit 81 identifies the PID contained in the header of the input packet, determines that the input packet contains picture data, and stores the data contained in the input packet to a buffer memory 83. When the input packet contains sound data, the data is stored in the buffer memory 84. When the input packet contains user data, the data is stored in the buffer memory 85.

The output data of the buffer memory 83 is sent as a bit stream of picture data to the decoding apparatus 50 through a picture decoding unit. The output data of the buffer memory 84 is sent to a sound decoding unit. The output data of the buffer memory 85 is sent to a user data decoding unit.

FIG. 12 is a block diagram showing the decoding apparatus 50. The decoding apparatus 50 receives a bit stream of picture data, decodes (expands) the picture data, and stores it to a frame memory 91.

A buffer memory 51 temporarily stores picture data that has been read as packets from the data storing unit 30 and that has been output as a bit stream from the packet disassembling unit 40. The picture data is composed of I picture data, P picture data, and B picture data. When a special reproducing operation is performed, the data storing unit 30 reads only I picture packets. However, when a special reproducing operation is performed, picture data does not contain P picture data or B picture data.

A header data decoding unit 53 decodes the header data contained in the picture data read from the buffer memory 51 at the timing corresponding to the picture reproducing process. In other words, the header data decoding unit 53 decodes the header of the picture data in the format shown in FIG. 6A. In addition, the header data decoding unit 53 decodes a sequence header, GOP header, and so forth (that are not shown). Various parameters obtained from the decoded results are sent to a coefficient data decoding unit 54 and a decoding controlling unit 55.

The coefficient data decoding unit 54 decodes picture data corresponding to the various parameters received from the header data decoding unit 53. In reality, the coefficient data decoding unit 54 performs a de-quantizing process, an inverse DCT, a variable-length decoding process, and so forth, corresponding to the MPEG method. The picture data decoded by the coefficient data decoding unit 54 is successively stored in the frame memory 91 in the bit map format. The picture data stored in the frame memory 91 is displayed on a display unit (not shown).

The decoding controlling unit 55 causes the coefficient data decoding unit 54 to start or stop the decoding process corresponding to the special reproduction start/stop command received from the user, and the parameters received from the header decoding unit 53. When a decoding error takes place in the coefficient data decoding unit 54, the decoding controlling unit 55 issues a command for stopping the decoding process or a command for discarding the decoded data.

Next, the operation of the decoding apparatus 50 will be described.

When the normal reproducing operation is performed for picture data, the data storing unit 30 successively reads packets stored in the storage medium 31. Thus, the decoding apparatus 50 receives picture data that contain complete I picture data, P picture data, and B picture data as shown in FIG. 4(1). The normal reproducing operation is performed when the user requests a normal reproducing operation or cancels a special reproducing operation.

When the normal reproducing operation is performed, the decoding controlling unit 55 always causes the coefficient data decoding unit 54 to perform the decoding process. However, when a decoding error takes place, the decoding controlling unit 55 causes the coefficient decoding unit to stop the decoding process. Thus, when the bit stream of the picture data shown in FIG. 4(1) is input, data is decoded in the order of I, P, B, B, P, I, . . . and so forth.

When a special reproducing operation is performed, the data storing unit 30 reads only I picture packets (that contain at least a part of I picture data) and sends them to the decoding apparatus 50. Thus, the decoding apparatus 50 receives a bit stream of the picture data shown in FIG. 4(4). The picture data is composed of I picture data and the remaining data. The remaining data is composed of P picture data or B picture data contained in the packet 2, 5, 6, or the like. The P picture data or B picture data sent as the remaining data to the decoding apparatus 50 is not reproduced when the special reproducing operation is performed.

Figure 13:
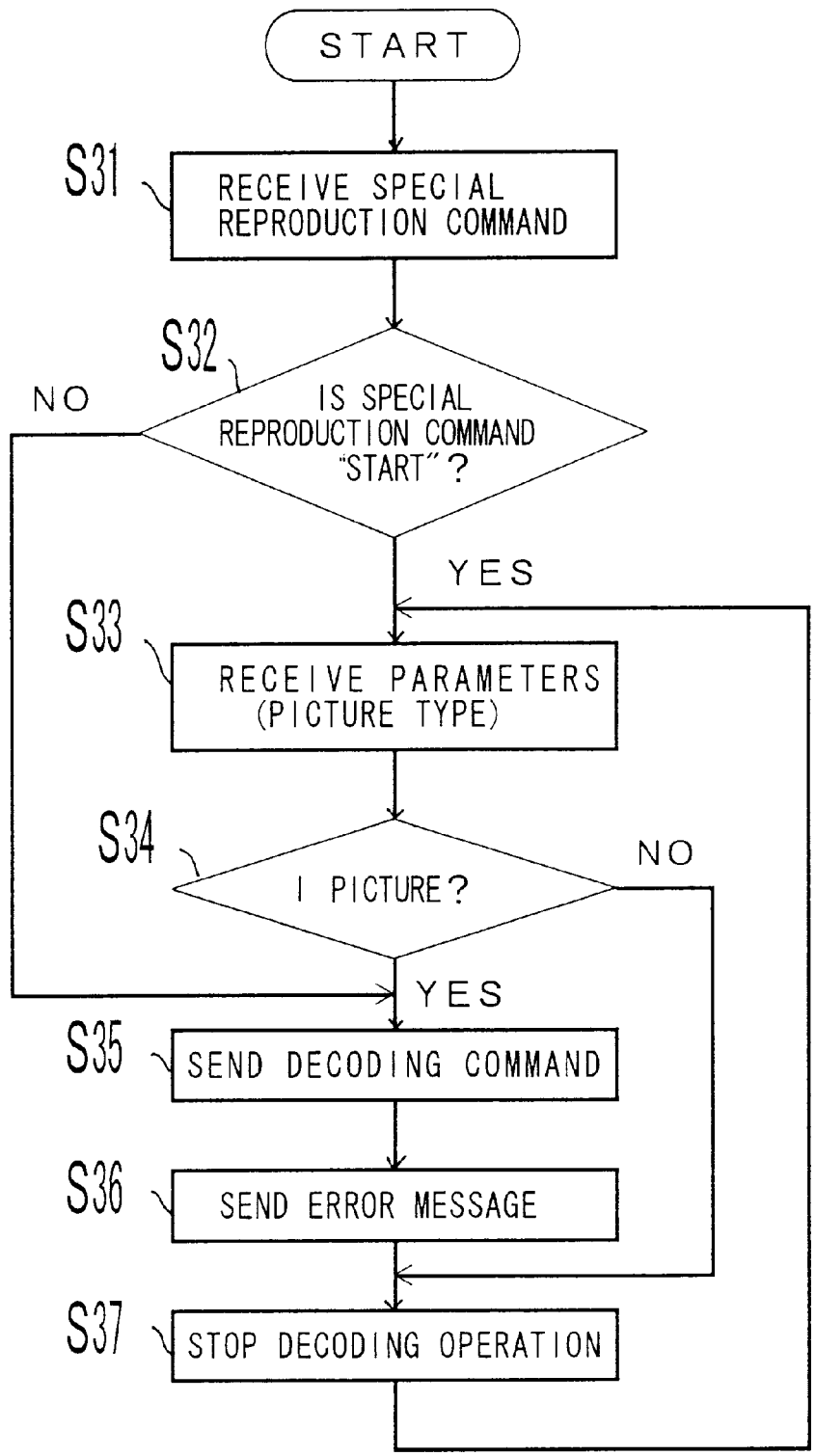
FIG. 13 is a operating flow chart for explaining an operation of a decoding controlling portion.

FIG. 13 is a operating flow chart showing the operation of the decoding controlling unit 55.

At step S31, a special reproduction command is received from the user. For example, the special reproduction command takes place when the user operates a high speed reproduction button. The special reproduction command is sent to the decoding controlling unit 55 through the controller 60. Thereafter, the flow advances to step S32. At step S32, it is determined whether or not the special reproduction command received at step S31 is "START". When the special reproduction command is "START", the special reproducing mode takes place. Thereafter, the flow advances to steps S33 through S37.

At step S33, the decoding controlling unit 55 receives parameters from the header data decoding unit 53. The parameters include a PCT shown in FIG. 6A. Thus, when a PCT that represents I picture data is sent to the decoding controlling unit 55, the decoding controlling unit 55 determines that the I picture data has been input. Likewise, when a PCT that represents P picture data or B picture data is sent to the decoding controlling unit 55, the decoding controlling unit 55 determines that P picture data or B picture data has been input.

Thereafter, the flow advances to step S34. At step S34, it is determined whether or not the input data is I picture data corresponding to the parameters received from the header data decoding unit 53. When the input data is I picture data, the flow advances to step S35. At step S35, the decoding controlling unit 55 causes the coefficient data decoding unit 54 to perform the decoding process. While the coefficient data decoding unit 54 is performing the decoding process, if a decoding error takes place, the flow advances to step S36. At step S36, the coefficient data decoding unit 54 sends the occurrence of the decoding error to the decoding controlling unit 55. When the decoding controlling unit 55 receives the occurrence of the error, the flow advances to step S37. At step S37, the decoding controlling unit 55 causes the coefficient data decoding unit 54 to stop the decoding process.

In the special reproducing mode, after the decoding process is started corresponding to the command at step S35, the decoding process is continued until a decoding error takes place. When the header data decoding unit 53 sends the parameters to the decoding controlling unit 55, the flow advances to step S32.

When the determined result at step S34 is "NO" (namely, the input data is not I picture data), it is assumed that the input picture is P picture data or B picture data. The flow advances to step S37. At step S37, the decoding controlling unit 55 causes the coefficient data decoding unit 54 to stop the decoding process.

After the decoding process is stopped at step S37, the flow returns to step S33. At step S33, the decoding controlling unit 55 waits until it receives parameters from the header data decoding unit 53. When the decoding controlling unit 55 receives a PCT that represents I picture data, it resumes the decoding process.

When the determined result at step S32 is "NO" (namely, the received special reproduction command is not "START"), the decoding controlling unit 55 assumes that the command is "CANCEL". In other words, the decoding controlling unit 55 determines that the moving picture reproducing mode has changed from the special reproducing operation to the normal reproducing operation.

When the special reproducing operation is canceled, the flow advances to step S35. At step S35, the decoding controlling unit 55 causes the coefficient data decoding unit 54 to perform the decoding process. When a decoding error takes place, the flow advances to step S37. At step S37, the decoding controlling unit 55 stops the decoding process. As with the special reproducing mode, the flow returns to step S33. At step S33, when the decoding controlling unit 55 receives a PCT that represent I picture data from the header data decoding unit 53, the decoding controlling unit 55 resumes the decoding process.

In the normal reproducing state, after the decoding controlling unit 55 starts the decoding process corresponding to the command at step S35, the decoding controlling unit 55 continues the decoding process until a decoding error takes place. Even if the header data decoding unit 53 sends the parameters to the decoding controlling unit 55, it does not stop the decoding process.

Figure 14:
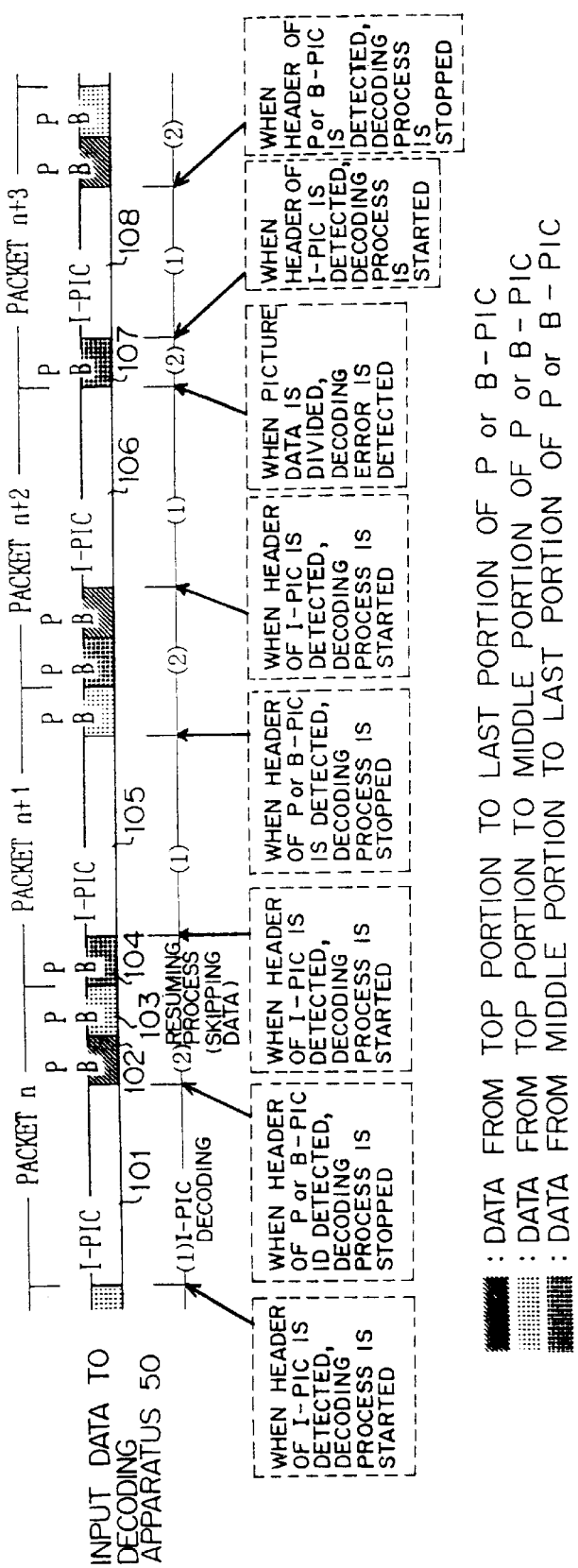
FIG. 14 is a schematic diagram for explaining a start operation and a stop operation of the decoding process in a special reproducing state.

FIG. 14 is a schematic diagram for explaining a start/stop operation of a decoding process in the special reproducing mode. In FIG. 14, packet n to packet n+3 are I picture packets read by the data storing unit 30 when the special reproducing operation is performed. Data that is input to the decoding apparatus 50 is a bit stream of picture data contained in the packet n to the packet n+3. The picture data contains the remaining data composed of P picture data or B picture data along with I picture data. The P picture data or the B picture data may be contained as complete data for one frame. However, the P picture data or the B picture data may be a part of the data for the first half portion (from the top portion to the middle portion) or the second half portion (from the middle portion to the last portion). In any case, whenever the special reproducing operation is performed, only I picture data is reproduced. Thus, the P picture data or the B picture data as the remaining data contained in I picture packets is discarded. Next, with reference to the flow chart shown in FIG. 13, the start operation and stop operation of the decoding process in the special reproducing mode will be described.

When I picture data 101 is input, the determined result at step S34 is "YES". Thus, the decoding apparatus 50 starts the decoding process. Consequently, the I picture data 101 is decoded.

When P picture data 102 (that may also be B picture data) is input, since the determined result at step S34 is "NO", the decoding apparatus 50 stops the decoding process. The decoding controlling unit 55 repeats a loop of steps S33 to S37. When I picture data is input, the decoding apparatus 50 resumes the decoding process. In other words, when I picture data is input, the decoding apparatus 50 starts the decoding process. Thus, the P or B picture data 102 to 104 are not decoded. Only the I picture data 105 is decoded.

Consider the case that I picture data 106 and P picture data 107 are input in succession. While the coefficient data decoding unit 54 is decoding the I picture data 106, the P picture data 107 is input. The P picture data 107 that does not have a header is contained in the bit stream. Thus, even if the P picture data 107 is input to the decoding apparatus 50, the header data decoding unit 53 cannot detect the P picture data 107. Consequently, the coefficient data decoding unit 54 continues the decoding process. In other words, the coefficient data decoding unit 54 tries to perform the decoding process for the P picture data 107.

However, since the P picture data 107 does not have a header, the coefficient data decoding unit 54 cannot extract parameters necessary for decoding the P picture data 107, and thereby a decoding error takes place. Thus, the decoding apparatus 50 stops the decoding process. When the next I picture data (I picture data 108) is input, the decoding apparatus 50 resumes the decoding process. The decoded picture data is successively stored in the frame memory 91.

When one complete frame cannot be composed of the decoded picture data, the data is discarded. Thus, even if the decoding process is started for the P picture data 107 and a part of the P picture data is stored in the frame memory 91 before a decoding error is detected, the data is discarded.

As described above, the decoding apparatus 50 can reproduce only I picture data.

Figure 15:
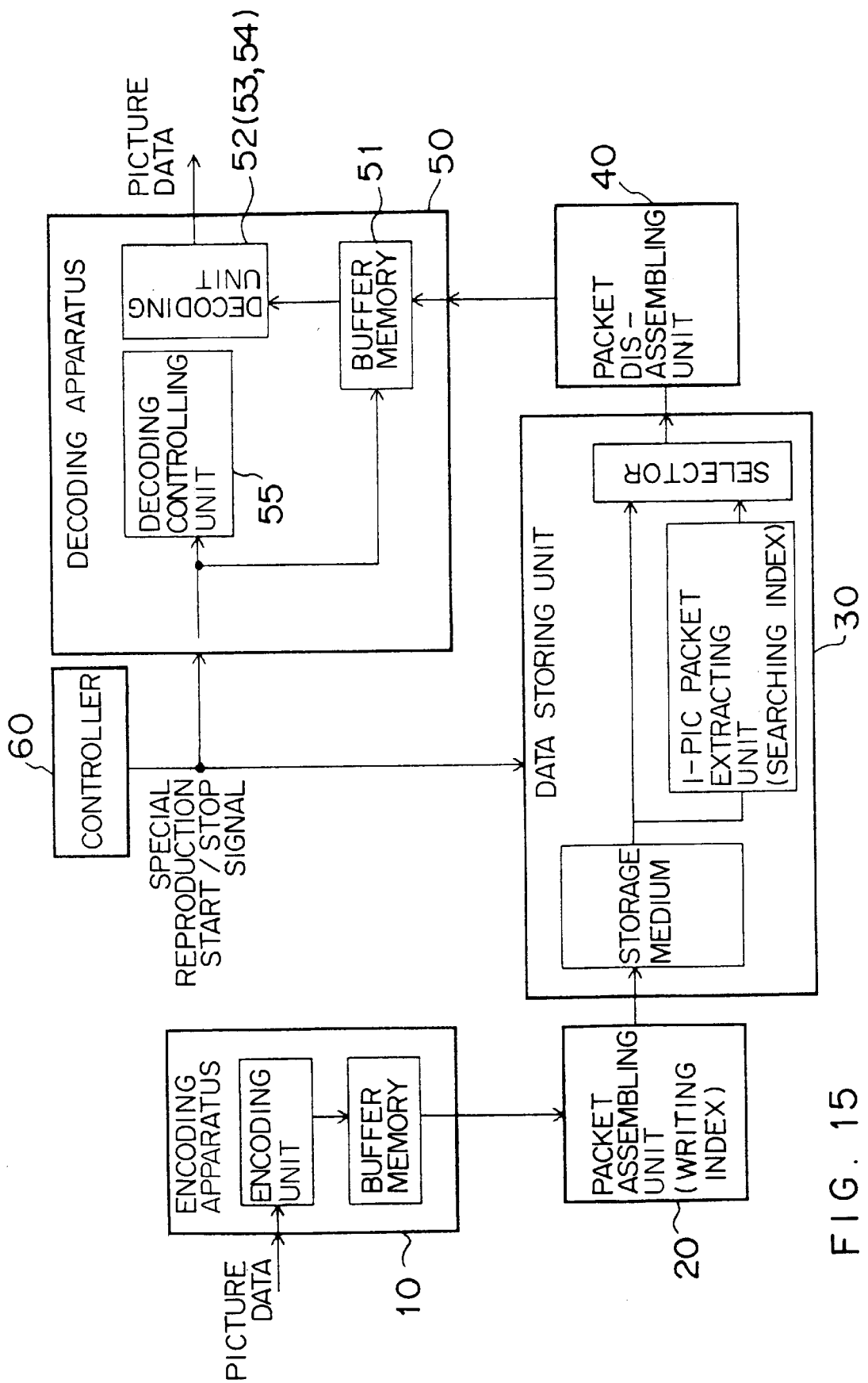
FIG. 15 is a block diagram showing another structure of a picture data encoding/decoding system according to the present invention.

FIG. 15 is a block diagram showing another structure of a picture data encoding/decoding system according to the present invention. In FIG. 15, similar units to those in FIG. 3 are denoted by similar reference numerals. The structure of the picture data encoding/decoding system shown in FIG. 15 is basically the same as that shown in FIG. 3, except that a special reproduction start/stop signal is also sent to a buffer memory 51. Next, the differences between the structure shown in FIG. 3 and the structure shown in FIG. 15 will be described.

Figure 16A:
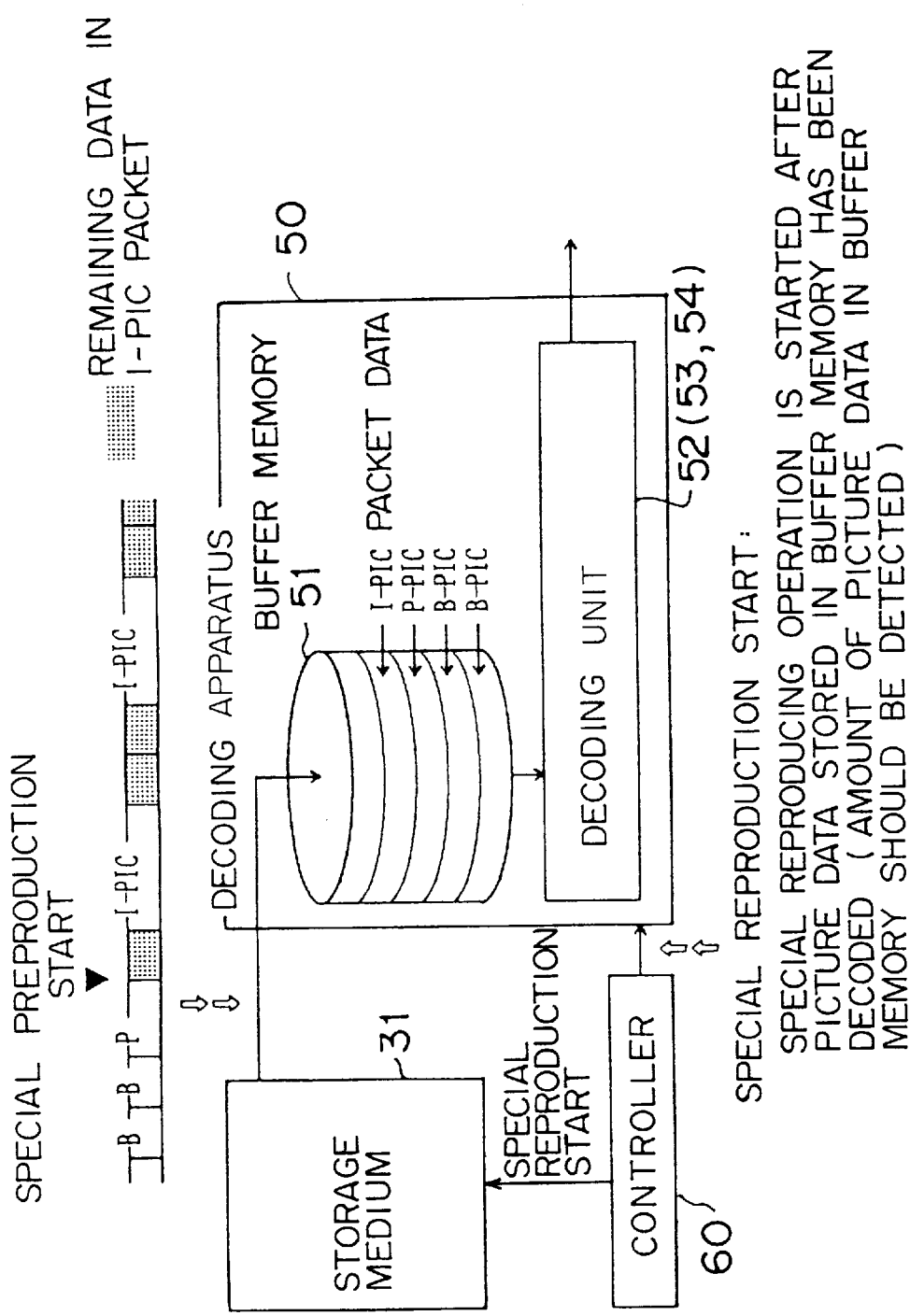
FIG. 16A is a schematic diagram for explaining a special reproducing operation performed in the system shown in FIG. 3.

FIG. 16A is a schematic diagram for explaining the special reproducing operation started by the system shown in FIG. 3. As described above, picture data read from the storage medium 31 is temporarily stored in the buffer memory 51 in the decoding apparatus 50. When the normal reproducing operation is performed, several frames of picture data are always stored in the buffer memory 51.

When the special reproducing operation is started under such contains, since several frames of the picture data have already been stored in the buffer memory 51, the special reproducing operation cannot be immediately performed. In other words, it is necessary to monitor the contents of the buffer memory 51, and decode all the picture data stored in the normal reproducing mode, and then start the special reproducing operation. To perform such a process, it is necessary to monitor the number of frames of the picture data stored in the buffer memory 51.

Figure 16B:
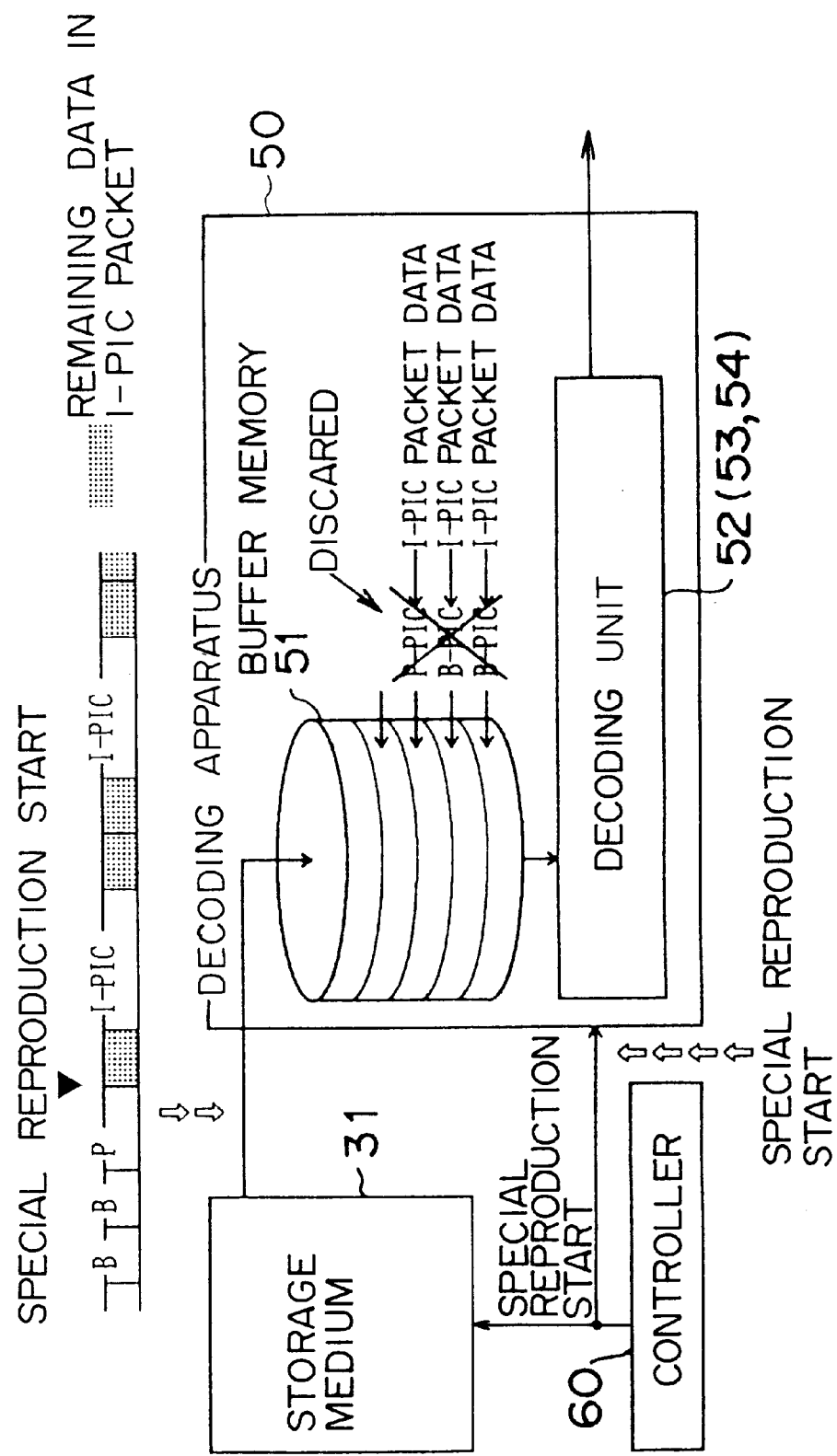
FIG. 16B is a schematic diagram for explaining a special reproducing operation performed in the system shown in FIG. 15.

FIG. 16B is a schematic diagram for explaining the special reproducing operation started by the system shown in FIG. 15. In this structure, when a special reproduction start command is received, the picture data stored in the buffer memory 51 is discarded. Thus, when the special reproduction start command is immediately received, the special reproducing operation can be simultaneously started. In addition, it is not necessary to monitor the number of frames of the picture data stored in the buffer memory 51.

In the system shown in FIG. 15, even if a special reproduction cancel command is received, the picture data stored in the buffer memory 51 is discarded.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A moving picture data storing system comprising:
    dividing means for dividing picture data comprising intra-frame encoded data encoded corresponding to an intra-frame encoding method and inter-frame predictively encoded data encoded corresponding to an inter-frame predictively encoding method into packets containing only intra-frame encoded data, both intra-frame encoded data and inter-frame encoded data, and only inter-frame encoded data;
    setting means for setting information whether or not the packet contains at least a part of the intra-frame encoded data at a predetermined position of the packet for each of the packets containing only intra-frame encoded data, and both intra-frame encoded data and inter-frame encoded data, and setting information the packet does not contain intra-frame encoded data at a predetermined position of the packet for the packet containing only inter-frame encoded data; and storing means for storing the packets on a data storage medium.

2. A moving picture data storing system for dividing picture data comprising intra-frame encoded data encoded corresponding to an intra-frame encoding method and inter-frame predictively encoded data encoding corresponding to an inter-frame predictively encoding method into packets in a predetermined format and storing the packets on a data storage medium, comprising:

detecting means for detecting the intra-frame encoded data from the picture data;

determining means for determining whether or not each packet contains at least a part of the intra-frame encoded data when the picture data is divided into the packets in the predetermined format; and means for setting information representing that the packet contains intra-frame encoded data at a predetermined position of a packet containing at least a part of the intra-frame encoded data, when said determining means has determined that the packet contains at least a part of the intra-frame encoded data.

3. A computer-readable storage medium being used to direct a computer to perform the functions of:

dividing picture data comprising intra-frame encoded data encoded corresponding to an intra-frame encoding method and inter-frame predictively encoded data encoding corresponding to an inter-frame predictively encoding method into the packets containing only intra-frame encoded data, both intra-frame encoded data and inter-frame encoded data, and only inter-frame encoded data;

setting information representing whether or not the packet contains at least a part of the inter-frame encoded data at a predetermined position of the packet for each of the packets containing only intra-frame encoded data, and both intra-frame encoded data and inter-frame encoded data, and setting information the packet does not contain intra-frame encoded data at a predetermined position of the packet for the packet containing only inter-frame encoded data; and storing the packets on a data storage medium.

4. A moving picture data reading system for reading packets from a recording medium comprising:

reading means for reading a first packet containing only intra-frame encoded data, and a second packet containing both intra-frame encoded data and inter-frame encoded data corresponding to storage information written to each of the packets out of the first packet having the stage information containing intra-frame encoded data, the second packet having the storage information containing intra-frame encoded data, and a third packet containing only inter-frame encoded data having the storage information not containing intra-frame encoded data when a special reproduction request is received; and sending means for sending the read packets to a decoding processing unit.

5. A moving picture data decoding system for decoding picture data with a plurality of packets of which picture data comprising intra-frame encoded data encoded corresponding to an intra-frame encoding method and inter-frame predictively encoded data encoding corresponding to an inter-frame predictively encoding method has been divided and stored as the packets containing only intra-frame encoded data both intra-frame encoded data and inter-frame predictively encoded data, and only inter-frame predictively encoded data, comprising:

decoding means for decoding a packet containing only intra-frame encoded data, and a packet containing both intra-frame predictively encoded data and inter-frame encoded data; and outputting means for outputting the decoded data of the intra-frame encoded data as reproduced moving picture data.

6. The moving picture data decoding system as set forth in claim 5, wherein the inter-frame predictively encoded data is removed by discarding data in which a decoding error takes place in a decoding process.

7. A moving picture data decoding system for decoding picture data with a plurality of packets of which picture data comprising intra-frame encoded data encoded corresponding to an intra-frame encoding method and inter-frame predictively encoded data encoding corresponding to an inter-frame predictively encoding method has been divided and stored as the packets containing only intra-frame encoded data, both intra-frame encoded data and inter-frame predictively encoded data, and only inter-frame predictively encoded data, comprising:

a buffer memory for storing a packet containing only intra-frame encoded data and a packet containing both intra-frame encoded data and inter-frame predictively encoded data as picture data;

detecting means for detecting the intra-frame encoded data and the inter-frame predictively encoded data;

decoding means for decoding the picture data stored in said buffer memory; and controlling means for starting a decoding process of said decoding means when said detecting means has detected the intra-frame decoded data and for stopping the decoding process of said decoding means when said detecting means has detected the inter-frame predictively encoded data.

8. The moving picture data decoding system as set forth in claim 7, wherein said decoding means is adapted for discarding the decoded data when one complete frame of the picture data cannot be reproduced therefrom.

9. The moving picture data decoding system as set forth in claim 7, wherein the picture data stored in said buffer memory is discarded when a special reproduction start command or a special reproduction cancel command is received.

10. A moving picture data decoding system for decoding picture data with a plurality of packets of which picture data comprising intra-frame encoded data encoded corresponding to an intra-frame encoding method and inter-frame predictively encoded data encoding corresponding to an inter-frame predictively encoding method has been divided and stored as the packets containing only intra-frame encoded data, and both intra-frame encoded data and inter-frame predictively encoded data, and only inter-frame predictively encoded data, comprising:

a storage medium for storing the packets;

a data reading unit for reading only a packet containing only intra-frame encoded data and a packet containing both intra-frame encoded data and inter-frame predictively encoded data from said storage medium when a special reproduction request is received; and a decoding unit for decoding packets read by said reading unit and outputting the decoded data of the intra-frame encoded data as reproduced moving picture data when the special reproduction request is received.

11. A moving picture data generating method, comprising the steps of:

dividing picture data comprising intra-frame encoded data encoded corresponding to an intra-frame encoding method and inter-frame predictively encoded data encoded corresponding to an inter-frame predictively encoding method into packets in a predetermined format; and writing information representing that the packet contains intra-frame encoded data to a predetermined position of a packet containing at least a part of the intra-frame encoded data.

12. A moving picture data generating method, comprising the steps of:

dividing picture data comprising first encoded data and second encoded data into fixed-length packets containing only first encoded data, both first encoded data and second encoded data, and only second encoded data; and writing information representing the presence of the first encoded data to packets that contain only the first encoded data and both the first encoded data and the second encoded data wherein the first encoded data is encoded corresponding to an intra-frame encoding method and the second encoded data is encoded corresponding to an inter-frame predictively encoding method.

13. The moving picture data generating method as set forth in claim 12, wherein the first encoded data is decoded with only intra-frame data composed of the first encoded data.

14. A moving picture data storing method comprising the steps of:

dividing picture data comprising intra-frame encoded data encoded corresponding to an intra-frame encoding method and inter-frame predictively encoded data encoding corresponding to an inter-frame predictively encoding method into packets containing only intra-frame encoded data, both intra-frame encoded data and inter-frame encoded data, and only inter-frame encoded data;

writing information whether or not the packet contains at least a part of the intra-frame encoded data at a predetermined position of the packet for each of the packets containing only intra-frame encoded data, and both intra-frame encoded data and inter-frame encoded data, and writing information the packet does not contain intra-frame encoded data at a predetermined position of the packet for the packet containing only inter-frame encoded data; and storing the packets on a data storage medium.

15. A moving picture data reading method for reading packets from a recording medium comprising the step of:

reading first a packet containing only intra-frame encoded data, and a second packet containing both intra-frame encoded data and inter-frame encoded data corresponding to storage information written to each of the packets out of the first packet having the storage information containing intra-frame encoded data, the second packet having the storage information containing intra-frame encoded data, and a third packet containing only inter-frame encoded data having the storage information not containing intra-frame encoded data when a special reproduction request is received; and sending the read packet to a decoding unit.

16. A moving picture data decoding method for decoding picture data with a plurality of packets of which picture data comprising intra-frame encoded data encoded corresponding to an intra-frame encoding method and inter-frame predictively encoded data encoded corresponding to an inter-frame predictively encoding method has been divided and stored as the packets containing only intra-frame encoded data, and both intra-frame encoded data and inter-frame predictively encoded data, and only inter-frame predictively encoded data, comprising the steps of:

decoding a packet containing only intra-frame encoded data, and a packet containing both intra-frame encoded data and inter-frame predictively encoded data; and outputting the decoded data of the intra-frame encoded data as reproduced moving picture data.

17. A computer program embodied on a computer readable medium and executable on a computer system for storing and retrieving moving picture data and directed by at least one packet of picture data contained in a computer-readable storage medium, comprising:

dividing the moving picture data intra-frame encoded data encoded corresponding to an intra-frame encoding method and inter-frame encoded data encoded corresponding to an inter-frame predictively encoding method, into packets, where said packets of picture data contain only said intra-frame encoded data, both said intra-frame encoded data and said inter-frame encoded data, and only said inter-frame encoded data; and setting storage information by said computer program in said packets of picture data containing only said intra-frame encoded data, and both said intra-frame encoded data and said inter-frame encoded data.

18. A moving picture data storing system comprising:

picture data comprising:

intra-frame encoded data encoded corresponding to an intra-frame encoding method; and inter-frame encoded data encoded corresponding to an inter-frame predictively encoding method, said moving picture data storing system dividing the picture data into packets containing only intra-frame encoded data, both intra-frame encoded data and inter-frame encoded data, and only inter-frame encoded data storing the packets on a data storage medium, and setting information whether or not the packet includes at least a part of the intra-frame encoded data at a predetermined position of the packet for each of the packets containing only intra-frame encoded data, and both intra-frame encoded data and inter-frame encoded data; and setting information the packet does not contain intra-frame encoded data at a predetermined position of the packet for the packet containing only inter-frame encoded data.

19. A moving picture data storing method, comprising the steps of:

dividing picture data, said picture data comprising intra-frame encoded data encoded corresponding to an intra-frame encoding method and inter-frame encoded data encoding corresponding to an inter-frame predictively encoding method into packets containing only intra-frame encoded data, both intra-frame encoded data and inter-frame encoded data, and only inter-frame encoded data;

storing the packets on a data storage medium; and writing information whether or not the packet contains at least a part of the intra-frame encoded data at a predetermined position of the packet for each of the packets containing only intra-frame encoded data, and both intra-frame encoded data and inter-frame encoded data, and writing information the packet does not contain intra-frame encoded data at a predetermined position of the packet for the packet containing only inter-frame encoded data.

20. A moving picture data storing and retrieving method, comprising the steps of:

converting said moving picture data into intra-frame encoded data using an intra-frame encoding method and inter-frame encoded data using an inter-frame predictively encoding method;

storing only the intra-frame encoded data, both the intra-frame encoded data and the inter-frame encoded data, or only the inter-frame encoded data, into each of packets;

writing information in a predetermined location of the packet indicating the packet contains only the intra-frame encoded data or both the intra-frame encoded data and the inter-frame encoded data;

retrieving said packet;

reading and displaying the packets containing only the intra-frame encoded data, both the intra-frame encoded data and the inter-frame encoded data and only the inter-frame encoded data, when a normal reproducing operation is selected; and reading and displaying the packets containing only the intra-frame encoded data, and both the intra-frame encoded data and the inter-frame encoded data, when a special reproducing. operation is selected.

* * * * *

UNITED STATES PATENT AND TRADEMARK OFFICE
CERTIFICATE OF CORRECTION

PATENT NO.: 5,991,503
DATED : November 23, 1999
INVENTOR(S): Hideki MIYASAKA, et al.

It is certified that error appears in the above-identified patent and that said Letters Patent is hereby corrected as shown below:

Col. 15, line 62, after "received; and" insert a new paragraph.

Col. 17, line 14, after "packets" insert --containing only intra-frame encoded data, both intra-frame encoded data and inter-frame data, and only inter-frame encoded data--.
    lines 14-15, delete "in a predetermined format";
    line 16, change "representing that" to --whether or not--;
    line 17, change "to" to --at--;
    line 18, change "a" (first occurrence) to --the--;
    line 18, change "containing at least a part of the intra-frame encoded data" to --for each of the packets containing only intra-frame encoded data, and both intra-frame data at a predetermined position of the packet for the packet containing only intra-frame encoded data--; and
Col. 17, line 16, after "contains" insert --at least a part of the--;

Signed and Sealed this

Fourth Day of July, 2000

Attest:

Q. TODD DICKINSON

*Attesting Officer*       *Director of Patents and Trademarks*